(12) United States Patent
Kan et al.

(10) Patent No.: US 9,342,574 B2
(45) Date of Patent: May 17, 2016

(54) DISTRIBUTED STORAGE SYSTEM AND DISTRIBUTED STORAGE METHOD

(75) Inventors: Masaki Kan, Tokyo (JP); Takashi Torii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 230 days.

(21) Appl. No.: 14/003,658

(22) PCT Filed: Mar. 8, 2012

(86) PCT No.: PCT/JP2012/055917
§ 371 (c)(1),
(2), (4) Date: Sep. 6, 2013

(87) PCT Pub. No.: WO2012/121316
PCT Pub. Date: Sep. 13, 2012

(65) Prior Publication Data
US 2013/0346365 A1    Dec. 26, 2013

(30) Foreign Application Priority Data
Mar. 8, 2011    (JP) .................................. 2011-050151

(51) Int. Cl.
*G06F 17/30* (2006.01)
*H04L 29/08* (2006.01)
*G06F 3/06* (2006.01)

(52) U.S. Cl.
CPC .......... *G06F 17/30575* (2013.01); *G06F 3/061* (2013.01); *G06F 3/065* (2013.01); *G06F 3/067* (2013.01); *G06F 3/0617* (2013.01); *G06F 17/30008* (2013.01); *G06F 17/30067* (2013.01); *G06F 17/30194* (2013.01); *G06F 17/30286* (2013.01); *H04L 29/0854* (2013.01)

(58) Field of Classification Search
CPC .............. G06F 3/061; G06F 17/30575; G06F 17/30286; G06F 17/30067; G06F 17/30008; H04L 29/0854
USPC ........................................................ 707/610
See application file for complete search history.

(56) References Cited

U.S. PATENT DOCUMENTS

| 7,325,111 | B1 * | 1/2008 | Jiang .............................. 711/162 |
| 7,653,668 | B1 * | 1/2010 | Shelat et al. .................. 707/610 |
| 7,831,735 | B1 * | 11/2010 | Kabra et al. .................. 709/248 |

(Continued)

FOREIGN PATENT DOCUMENTS

| JP | 11-195044 A | 7/1999 |
| JP | 2006-12005 A | 1/2006 |

(Continued)

OTHER PUBLICATIONS

Shunsuke Nakamura et al., "A Cloud Storage Adaptable to Read-Intensive and Write-Intensive Workload", IPSJ SIG Notes [CD-ROM], Feb. 15, 2011, vol. 2011-OS-116, No. 9, pp. 1-7.

(Continued)

*Primary Examiner* — Shahid Alam
*Assistant Examiner* — Andrew N Ho

(57) ABSTRACT

A distributed storage system of the present invention includes a plurality of data nodes coupled via a network and respectively including data storage units. At least two of the data nodes hold in the respective data storage units thereof replicas of a plurality of types of data structures that are logically identical but are physically different between the data nodes.

16 Claims, 29 Drawing Sheets

(56) References Cited

U.S. PATENT DOCUMENTS

| | | | |
|---|---|---|---|
| 7,885,923 B1* | 2/2011 | Tawri et al. | 707/610 |
| 8,352,424 B2* | 1/2013 | Zunger et al. | 707/610 |
| 8,620,861 B1* | 12/2013 | Uhrhane et al. | 707/610 |
| 2001/0044879 A1* | 11/2001 | Moulton et al. | 711/114 |
| 2002/0138559 A1* | 9/2002 | Ulrich | G06F 17/30067 709/203 |
| 2005/0091255 A1* | 4/2005 | Rajan | G06F 17/30286 |
| 2005/0278385 A1* | 12/2005 | Sutela | G06F 17/30578 |
| 2006/0168411 A1* | 7/2006 | Ohno et al. | 711/162 |
| 2006/0206621 A1* | 9/2006 | Toebes | G06F 17/30575 709/238 |
| 2007/0094467 A1* | 4/2007 | Yamasaki | 711/162 |
| 2007/0156842 A1* | 7/2007 | Vermeulen et al. | 709/217 |
| 2009/0083342 A1* | 3/2009 | Tomic et al. | 707/204 |
| 2010/0153337 A1* | 6/2010 | Murata | 707/610 |
| 2011/0055156 A1* | 3/2011 | Roberts et al. | 707/626 |
| 2011/0295796 A1* | 12/2011 | Muhunthan et al. | 707/610 |

FOREIGN PATENT DOCUMENTS

| | | |
|---|---|---|
| JP | 2009-522659 A | 6/2009 |
| JP | 2010-146067 A | 7/2010 |
| JP | 2011-8711 A | 1/2011 |

OTHER PUBLICATIONS

Avinash Lakshman et al., "Cassandra—Decentralized Structured Storage System", ACM SIGOPS Operating Systems Review, vol. 44, Issue 2, ACM, Apr. 2010, pp. 35-40.

International Search Report for PCT Application No. PCT/JP2012/055917 mailed on Jun. 12, 2012.

* cited by examiner

FIG. 5A

| TABLE IDENTIFIER | REPLICA IDENTIFIER | DATA STRUCTURE | |
|---|---|---|---|
| Stocks | 0 | B | 30 |
|  | 1 | B | 60 |
|  | 2 | C | 60 |
| WORKERS | 0 | B | 0 |
|  | 1 | B | 30 |
|  | 2 | C | 20 |
| Shops | 0 | A | 0 |
|  | 1 | B | 30 |
|  | 2 | C | 240 |
| Salary | 0 | B | 30 |
|  | 1 | B | 30 |
|  | 2 | C | 240 |

FIG. 5B

| DATA STRUCTURE | TYPE OF TABLE STORAGE FORMAT |
|---|---|
| A | QUEUE |
| B | ROW-STORE |
| C | COLUMN-STORE |
| ... | ... |

FIG. 6A

Table

| Key | value1 | value2 | value3 |
|---|---|---|---|
| K1a | v1a | v2a | v3a |
| K1b | v1b | v2b | v3b |
| K1c | v1c | v2c | v3c |
| K1d | v1d | v2d | v3d |
| ... | | | |

FIG. 6B

| |
|---|
| K1a,v1a,v2a,v3a |
| K1b,v1b,v2b,v3b |
| K1c,v1c,v2c,v3c |
| K1d,v1d,v2d,v3d |
| ... |

REPLICA IDENTIFIER:0
DATA STRUCTURE B (ROW-STORE)

FIG. 6C

REPLICA IDENTIFIER :1
DATA STRUCTURE B ( ROW-STORE )

| |
|---|
| K1a,v1a,v2a,v3a |
| K1b,v1b,v2b,v3b |
| K1c,v1c,v2c,v3c |
| K1d,v1d,v2d,v3d |
| ... |

FIG. 6D

REPLICA IDENTIFIER :2
DATA STRUCTURE C ( COLUMN-STORE )

| | | | |
|---|---|---|---|
| K1a,K1b,K1c,K1d, | ... | | |
| v1a,v1b,v1c,v1d, | ... | | |
| v2a,v2b,v2c,v2d, | ... | | |
| v3a,v3b,v3c,v3d, | ... | | |

FIG. 8

| TABLE IDENTIFIER | REPLICA IDENTIFIER | ARRANGEMENT NODE |
|---|---|---|
| Stocks | 0 | 1 |
|  | 1 | 2 |
|  | 2 | 3 |
| WORKERS | 0 | 4 |
|  | 1 | 1 |
|  | 2 | 2 |
| Shops | 0 | 3 |
|  | 1 | 4 |
|  | 2 | 1 |
| Salary | 0 | 2 |
|  | 1 | 3 |
|  | 2 | 4 |

FIG. 15

| TABLE IDENTIFIER | REPLICA IDENTIFIER | NUMBER OF PARTITIONS |
|---|---|---|
| Stocks | 0 | 1 |
|  | 1 | 1 |
|  | 2 | 1 |
| WORKERS | 0 | 1 |
|  | 1 | 1 |
|  | 2 | 4 |
| Shops | 0 | 1 |
|  | 1 | 1 |
|  | 2 | 1 |
| Salary | 0 | 1 |
|  | 1 | 16 |
|  | 2 | 1 |

FIG. 16

| TABLE IDENTIFIER | REPLICA IDENTIFIER | NUMBER OF PARTITIONS |
|---|---|---|
| Stocks | 0 | 1 |
|  | 1 | 2 |
|  | 2 | 3 |
| WORKERS | 0 | 4 |
|  | 1 | 1 |
|  | 2 | 2,3,5,6 |
| Shops | 0 | 3 |
|  | 1 | 4 |
|  | 2 | 1 |
| Salary | 0 | 2 |
|  | 1 | 3,5–15 |
|  | 2 | 4 |

FIG. 25

| TABLE IDENTIFIER | REPLICA IDENTIFIER | ARRANGEMENT NODE | DISTRIBUTION ARRANGEMENT STRATEGY | ARRANGEMENT PHYSICAL MEDIUM |
|---|---|---|---|---|
| Stocks | 0 | 1 | --- | memory |
|  | 1 | 2 | --- | memory |
|  | 2 | 3 | --- | memory |
| WORKERS | 0 | 4 | --- | memory |
|  | 1 | 1 | --- | memory |
|  | 2 | 2,3,5,6 | roundRobin | memory |
| Shops | 0 | 3 | --- | memory |
|  | 1 | 4 | --- | memory |
|  | 2 | 1 | --- | memory |
| Salary | 0 | 2 | --- | memory |
|  | 1 | 3,5-15 | DISTRIBUTION OF COLUMN 1 VALUE | memory |
|  | 2 | 4 | --- | memory |
| orders | 0 | 0 | --- | memory |
|  | 1 | 1 | --- | memory |
|  | 2 | 2-10 | TIME SERIES | memory, disk,disk,··· |

DISTRIBUTED STORAGE SYSTEM AND DISTRIBUTED STORAGE METHOD

CROSS-REFERENCE TO RELATED APPLICATIONS

This application is a National Stage Entry of PCT/JP2012/055917 filed Mar. 8, 2012, which claims priority of Japanese Patent Application No. 2011-050151 (filed on Mar. 8, 2011), the contents of all of which are incorporated herein by reference, in their entirely.

TECHNICAL FIELD

The present invention relates to a distributed storage. More specifically, the invention relates to a distributed storage system, a distributed storage method, and a distributed storage device in which control over a data structure can be performed.

BACKGROUND

<Distributed Storage System>

There has been used a distributed storage system (Distributed Storage System) that implements a system where a plurality of computers (data nodes, or also referred to just as "nodes") are coupled via a network, and data is stored in a data storage unit (such as an HDD (Hard Disk Drive) or a memory) of each computer and is utilized.

In a typical distributed storage technology, software or specially dedicated hardware implements determinations as follows:

on which computer (node) data is to be arranged;

by which computer (node) processing is to be performed. Then, by dynamically changing operation of the software or the specially dedicated hardware according to a state of the system, a resource usage amount in the system is adjusted and performance for a user (client computer) is improved.

In the distributed storage system, data is distributed in a plurality of the nodes. Thus, a client who is going to access data first needs to know which node holds the data. Further, when there are a plurality of the nodes that hold the data, the client needs to know which (one or more) nodes to be accessed.

In the distributed storage system, there has been generally used for file management, a system separately saving a file entity and metadata of the file (indicating a storage location of the file, a file size, an owner of the file, and the like).

<Metaserver Scheme>

As one of technologies for a client to identify a node that holds data in the distributed storage system, a metaserver scheme is known. In the metaserver scheme, there is provided a metaserver configured by one or a plurality (but rather a small number) of the computers managing location information of data.

In the metaserver scheme, however, there is a problem that, with an increase in a size of a configuration of a distributed storage system, processing performance of the metaserver configured to perform processing to detect a location of a node that stores data becomes deficient (the number of nodes to be managed by one metaserver becomes immense, so that the processing performance of the metaserver cannot keep up with the increased number of the nodes), and the introduced metaserver rather becomes a bottleneck in terms of access performance.

<Distributed KVS>

As another method (technology) for identifying the position of a node that stores data, there is provided a method of finding the position of the data using a dispersion function (such as a hash function). The method of this type is referred to as a distributed KVS (Key Value Store: key value store), for example.

In the distributed KVS, all clients share the dispersion function and a list (node list) of the nodes participating in the system.

Further, stored data is partitioned into data fragments (Values) having a fixed length or an arbitrary length. An identifier (key) that can be uniquely identified is given for each data fragment (Value), and a pair of the (Key, Value) is stored. By changing the node (server) of a saving destination according to the value of the key, for example, data can be distributed and saved in a plurality of the nodes.

When accessing data, each client uses the key as an input value of the dispersion function and arithmetically obtains the position of the node that stores the data therein, based on an output value of the dispersion function and the node list.

Basically, the dispersion function of information shared among the clients does not change over time (time-invariant). On the other hand, content of the node list is changed as needed due to a failure or addition of the node. For this reason, it is necessary for the client to be able to access those information with an arbitrary method.

<Replication>

In the distributed storage system, it is a common practice to hold replicas of data in a plurality of the nodes, and to utilize the replicas of data for load distribution, in order to ensure availability (Availability: ability that the system can continuously operate).

Patent Literature 1 describes a technology of implementing load distribution using a replica of data that is generated.

Patent Literature 2 searched by a prior art search conducted about the present invention discloses a configuration where a server defines an information structure definition body by an information structure definition unit, and a registration client constructs a database using the information structure definition body, generates a data base access tool, and registers information in the database using this tool. Patent Literature 3 discloses a configuration of a distributed type storage system. The distributed type storage system includes storage nodes configured to store replicas of objects, where each replica is accessible via a unique locator value, and a keymap instance configured to store a respective keymap entry for each object. For the given object, the respective keymap entry includes the key value and each locator value corresponding to replicas of the object.

PATENT LITERATURE 1

JP Patent Kokai Publication No. JP-P-2006-12005A (Japanese Patent No. 4528039)

PATENT LITERATURE 2

JP Patent Kokai Publication No. JP-A-11-195044 (Japanese Patent No. 3911810)

PATENT LITERATURE 3

JP Patent Kohyo Publication No. JP-P-2009-522659A

SUMMARY

The following analyses about the related arts will be given below.

In each of the distributed storage systems of the related arts, replica data is held in the same physical structure in a plurality of the nodes of the distributed storage system in order to maintain availability. With this arrangement, access response performance and availability are guaranteed. However, the replica data is held in the same physical structure. Thus, conversion to a different data structure must be performed and a storage for holding the different data structure must be provided for an application having a different data utilization characteristic.

Accordingly, it is an object of the present invention to provide a distributed storage system and a distributed storage method in which availability of data replication in a distributed storage is ensured and at least one of reduction of storage utilization efficiency and lowering of response performance can be avoided.

In order to solve at least one of the above-mentioned problems, the present invention is generally configured as follows, though no particular limitation is imposed on the present invention.

According to the present invention, there is provided a distributed storage system, comprising:

a plurality of data nodes coupled via a network, the data nodes including data storage units, respectively, wherein the data nodes of replication destination of data, include at least two data nodes that hold, in the respective data storage units thereof, data structures logically identical but physically different between the data nodes.

According to the present invention, there is provided a data node apparatus comprising a data storage unit, the data node apparatus coupled to other data nodes via a network, a plurality of data nodes forming a distributed storage system, wherein in the case of replication of data to be updated to a plurality of the data nodes, the data node apparatus holds in the data storage unit thereof a data structure that is logically identical to but is physically different from at least one of other data nodes According to the present invention, there is provided a distributed storage method in a system comprising a plurality of data nodes coupled via a network, the plurality of data nodes respectively including data storage units, the method comprising:

at least two of the data nodes of data replication destinations, in respective data storage units thereof, holding data structures that are logically identical but are physically different between the at least two of the data nodes.

According to exemplary embodiments, the plurality of data nodes may respectively perform conversion to a target data structure asynchronously with a date update request. Alternatively, according to exemplary embodiments, the data nodes may hold received data in an intermediate data retention structure to return a response for the update request, and asynchronously converts a data structure held in the intermediate data retention structure to a target data structure. Alternatively, according to exemplary embodiments, a data arrangement destination, the data structure of the arrangement destination, and data partitioning is variably controlled, for each table set in advance.

According to the present invention, availability of data replication in the distributed storage is ensured, and at least one of reduction of storage utilization efficiency and lowering of response performance can be avoided.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIGS. 5A and 5B are tables schematically showing data structure management information 921 in the first exemplary embodiment of the present invention.

FIG. 6 includes FIGS. 6A to 6D which are tables explaining data retention structures of a table in the first exemplary embodiment of the present invention.

FIG. 8 is a table showing an example of data arrangement specifying information 922 in the first exemplary embodiment of the present invention.

FIG. 15 is a table schematically showing data structure management information 921 in a second exemplary embodiment of the present invention.

FIG. 16 is a table schematically showing data arrangement specifying information 922 in the second exemplary embodiment of the present invention.

FIG. 25 is a table explaining a structure information retention unit 92 in the third exemplary embodiment.

PREFERRED MODES

Figure 1:
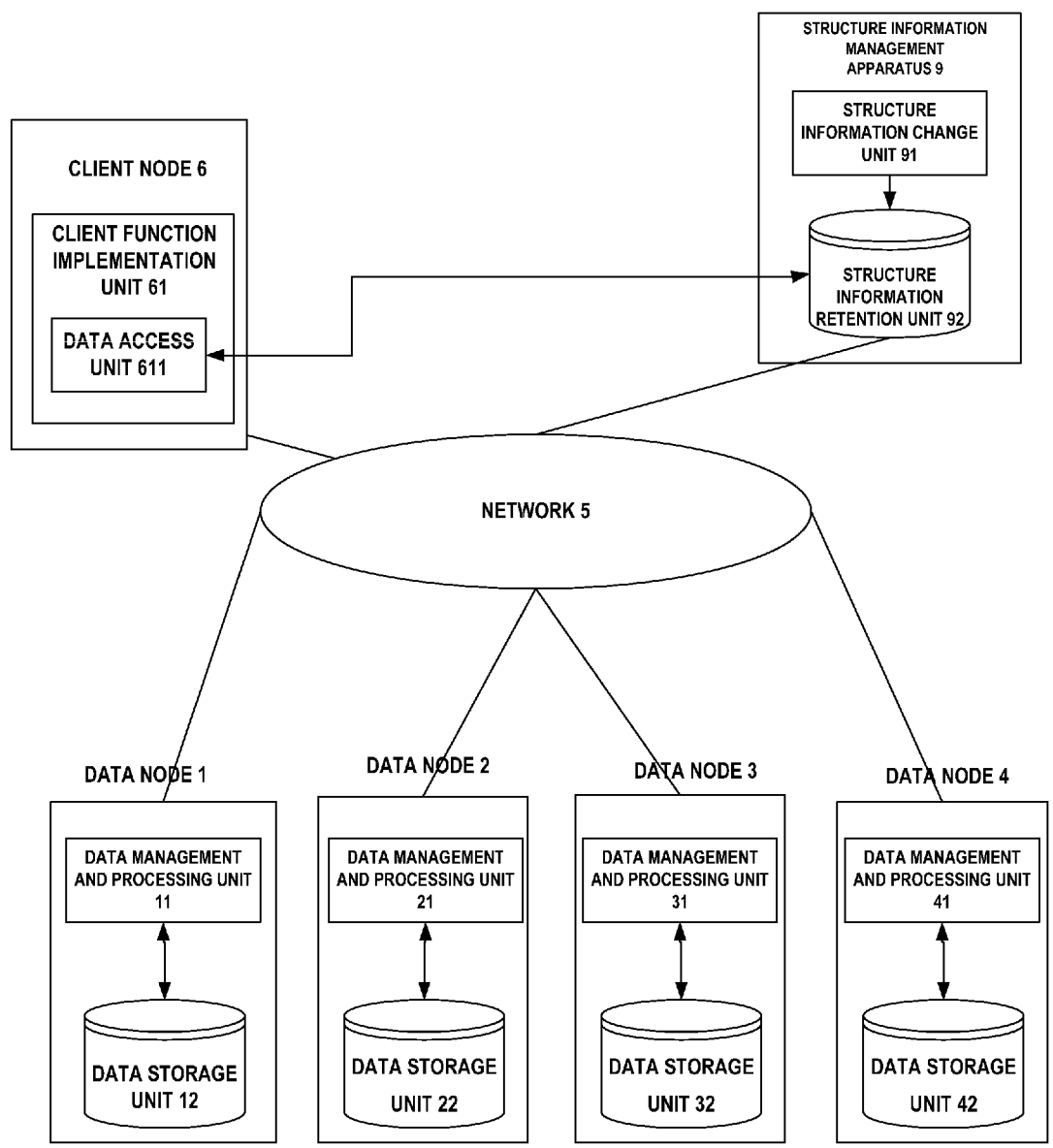
FIG. 1 is a diagram illustrating a system configuration of a first exemplary embodiment of the present invention.

According to one of preferred modes (Preferred Modes) of the present invention, replicas (replicas) having a plurality of types of data structures that are logically identical but physically different among data arrangement nodes (referred to as "data nodes") are held. In the present invention, a trigger for applying data structure conversion to be performed asynchronously with a write (update) request can be controlled. In the present invention, an intermediate structure (intermediate data retention structure) that gives priority to a response characteristic for a Write is provided, and a data structure held in the intermediate structure is asynchronously converted to a target data structure.

In a preferred mode of the present invention, there is provided an interface configured to change a control parameter. Control is performed in such a manner that the control parameter is changed, according to the access load. Alternatively, control is performed so that, when a processing load increases, granularity of partitioning is reduced.

According to a preferred mode of the present invention, a key value store (Key Value Store) that makes it possible to hold a plurality of data structures can be implemented. According to a preferred mode of the present invention, the replicas having the data structures that have logically identical content but are physically different are held. As a result, this arrangement makes it possible to:

accommodate access loads of different types at high speed; and
  use the replicas for maintaining availability for a different application, thereby enabling efficient utilization of data capacity.

In a preferred mode of the present invention, a data node that receives data from the transmission source of the data may hold the received data in the form of an intermediate structure instead of immediately converting the received data to a target structure synchronously with replication, and may perform conversion to the target structure asynchronously with the replication. The intermediate structure is provided which gives priority to the response characteristic for an access request, e.g., holding data in a buffer and immediately returning a response to a Write request. Then the data structure held in the intermediate structure is converted to the target structure asynchronously. By doing so, it makes it possible to maintain a required high availability while avoiding a bottleneck in terms of access performance that may occur due to the conversion process of the data structure. Simultaneous updating and conversion to a plurality of types of data structures in a plurality of data nodes in a distributed storage system tend to be a bottleneck in terms of performance. In a preferred mode of the present invention, the structure specialized in a Write (intermediate data retention structure that gives priority to response performance for the Write) is provided. Then, when replication for ensuring availability is executed, replication is performed in the intermediate structure in a synchronous (Sync) manner. Data held in the intermediate structure is then converted to the target structure that is proper, in an asynchronous (Async) manner.

Further, according to a preferred mode of the present invention, data nodes, data structures, and the trigger (trigger) for asynchronously performing the structure conversion can be controlled, thereby enabling to cope with various applications and a change in load.

According to a preferred mode of the present invention, though no particular limitation is imposed, data arrangement, the data structures, and partitioning (partitioning) can be controlled, for each table, for example.

A combination of items listed below and the like are selected to define each of the data structures:

row-store (Row-store):
  append-type (for adding a record in a data storage region)
  update type
  column-store (Column-store):
    presence or absence of compression
  write log(structure for adding update information in order to give priority to write performance)
  presence or absence of index (index data for search):
  sorting (Sorting) of the order of data storage:
  presence or absence of Portioning and the number of partitions:
  unit of partitioning (Partitioning) and algorithm:

According to a preferred mode of the present invention, which data structure data should have as well as to which data nod the data should be arranged, for example, is controlled.

When only a Write request is made, the write log(Write Log) or an append-only row-table (Row-table) is employed.
  Alternatively, for a combination of a Read and a Write, the row-table (Row-table) is selected.
  Further, for an analysis application, the column-store (or a column-oriented database) is selected, for example. The column-store format streamlines read access to the storage for query (Query).
  Alternatively, control may be so performed that granularity of partitioning (data partitioning) is relatively reduced for distributed processing, and the granularity of partitioning is increased or partitioning is not performed for centralized processing.
  Further the trigger (trigger) for converting data held in the intermediate structure to the target structure in an asynchronous (Async) manner may be controlled.
  Alternatively, the trigger for the data conversion may be adjusted according to the degree of freshness (a measure of newness) of data needed for the analysis application.

According to a preferred mode of the present invention, in a distributed storage system including a plurality of the data arrangement nodes (data nodes) each including a data storage unit (12 in FIG. 1) and coupled via a network, when replication to be performed in response to a data update request from a client is executed, each of one or a plurality of the data nodes of replication destinations stores in the data storage unit (12 in FIG. 1) replica data in the data structures of one or a plurality of types different from the data structure in a database that has received the update request. In that case, each of the one or the plurality of the data nodes temporarily holds the replica data in the intermediate structure, returns a response to the update request to the client, performs conversion to the target data structure asynchronously with the update request, and then stores the converted structure.

According to one of modes of the present invention, an apparatus (9 in FIG. 1) configured to hold and manage data structure information (such as data structure management information and data arrangement specifying information) is provided. Data access unit (611 in FIG. 1) and access process unit that access the data node (112 in FIG. 4) determine the data structure (physical structure) for data to be replicated, using the data structure information. For this reason, replica data can be held in the data structure different for each distributed storage node.

According to one of the modes of the present invention, the data node of a replication destination in the distributed storage system temporarily hold data in the intermediate structure (intermediate data retention structure, also referred to as an intermediate buffer structure) that gives priority to update processing performance in response to an update request from the client, makes a response to the update request, and then asynchronously executes conversion to the data structure specified in the data structure management information. For this reason, response performance in an update process can be maintained while holding each of the plurality of types of the data structures in the intermediate holding structure.

According to one mode of the present invention, the plurality of types of data structures are held, and according to the content of access, the client side may allocate processing to the data structure that is appropriate (allocate the processing so that the data node holding the appropriate data structure is accessed). For this reason, access processing performance can be improved.

The related arts described above will be analyzed in terms of the above-mentioned modes of the present invention.

As described above, in each of the distributed storage systems of the related art, replica data are held in the same physical structure in the plurality of the nodes in order to maintain availability. For this reason, the format for holding and storing the replica data for maintaining the availability cannot be controlled.

Varibale control cannot be performed for the specifications for holding and storing the replica data, such as:
  storage location of data;
  data arrangement (internal) structure
  storage format indicating whether data is stored in a distributed manner, or concentrically stored.

In data migration or the like, storage/database of a data migration source and storage/database of a data migration destination same data may be said that the same data is represented by different data structures. For example, in the case where in a configuration where replica data is held in the same data structure (physical structure) in a plurality of nodes, each node holds a replica for each of mutually different data structures, storage capacity is excessively needed (in this case, the storage capacity needed for replicas is calculated by data capacity×the number of the replicas×the number of types of data structures). For that reason, a lot of hardware such as computers and disks should be provided and utilized. Purchase cost and operational cost such as power consumption will thereby increase (a large volume of data copies and a large quantity of data structure conversion processes are needed).

Based on an application logic desired to be implemented, a user (application developer) of the distributed storage system of the related art needs to perform:
  selection of an appropriate data structure;
  design of an appropriate schema; and
  proper use of appropriate database software and appropriate setting. A high expertise for a database system and a storage system is required for the user to perform each of these operations. Thus, it is actually difficult for the user to perform these operations.

Even if the appropriate data structure has been selected for replication, it is necessary to provide a plurality of database systems and to perform data migration. These processes impose a great load such as a data input/output on a computer (server). For this reason, data in the database of a migration destination has no choice but to become older than that in the database of a migration source. Further, as described above, when data of the same content are held in a plurality of mutually different data structures, storage utilization efficiency will deteriorate.

According to one of modes of the present invention, by holding replica data in a plurality of types of data structures (physical structures), a bottleneck caused by data structure conversion can be solved, and storage utilization efficiency can be enhanced while ensuring a required high availability and performance such as a high-speed response.

The following describes several exemplary embodiments with reference to appended drawings.

<First Exemplary Embodiment>

A first exemplary embodiment of the present invention will be described with reference to drawings. FIG. 1 is a diagram illustrating an example of a configuration of a system in the first exemplary embodiment of the present invention. The system includes data nodes 1 to 4, a network 5, and structure information management apparatus 9.

The data nodes 1 to 4 are data storage nodes that constitute a distributed storage, and are constituted from one or more arbitrary numbers of the data storage nodes. The network 5 achieves communication among network nodes including the data nodes 1 to 4. The client node 6 is a computer node configured to access the distributed storage. The client node 6 is not necessarily present independently. An example where each of the data nodes 1 to 4 also serves as the client computer will be described later with reference to FIG. 2.

The data nodes 1 to 4 respectively include data management and processing units 11, 21, 31, 41, and respectively include data storage units 12, 22, 32, and 42.

The data management and processing unit X1 (X=1, 2, 3, or 4) receives a request for accessing the distributed storage and executes a process.

The data storage unit X2 (X=1, 2, 3, or 4) holds and records data taken charge of by an associated one of the data nodes.

The client node 6 includes client function implementation unit 61.

The client function implementation unit 61 accesses the distributed storage formed by the data nodes 1 to 4.

The client function implementation unit 61 includes data access means (data access unit) 611.

The data access unit 611 obtains structure information (data structure management information and data arrangement specifying information) from the structure information management unit 9, and identifies the data node of an access destination, using the structure information.

In each of the data nodes 1 to 4 or an arbitrary device (switch or intermediate node) in the network 5, a part or all of the structure information stored in a structure information retention unit 92 of the structure information management unit 9 may be held in a cache (not shown) in its own device, or another device.

That is, in the following description about operation of the exemplary embodiment, an access to the structure information stored in the structure information retention unit 92 may be made to the cache in its own device, or a predetermined location set in advance. A known distribution system technology can be applied to synchronization of the structure information stored in the cache. Thus, details of the synchronization will be omitted. As is well known, utilization of a cache can contribute to speed up of storage performance.

The structure information management apparatus 9 includes structure information change unit 91 configured to change structure information and the structure information retention unit 92 configured to hold the structure information. The structure information retention unit 92 includes data structure management information 921 (see FIG. 4) and data arrangement specifying information 922 (see FIG. 4). The data structure information management information 921, which will be described later with reference to FIG. 5, includes entries of the number corresponding the number of replicas of data. Each entry comprises, in association with a table identifier, a replica identifier for identifying a replica, data structure information identifying the type of a data structure associated with the replica identifier, and an update trigger that is information indicating a period to be taken for the replica to be stored as the data structure that has been specified. The data arrangement specifying information 922, which will be described later with reference to FIG. 8, comprises, in association with the table identifier, the replica identifier and information on one or more of the data nodes of data arrangement destinations, associated with the replica identifier.

The client node 6 in this exemplary embodiment is not necessarily needed to be provided independently (separately) from the data nodes 1 to 4. That is, as will be described as a variation example, a configuration including the client function implementation unit 61 at an arbitrary one or more of the nodes may be employed.

<Variation Example of First Exemplary Embodiment>

Figure 2:
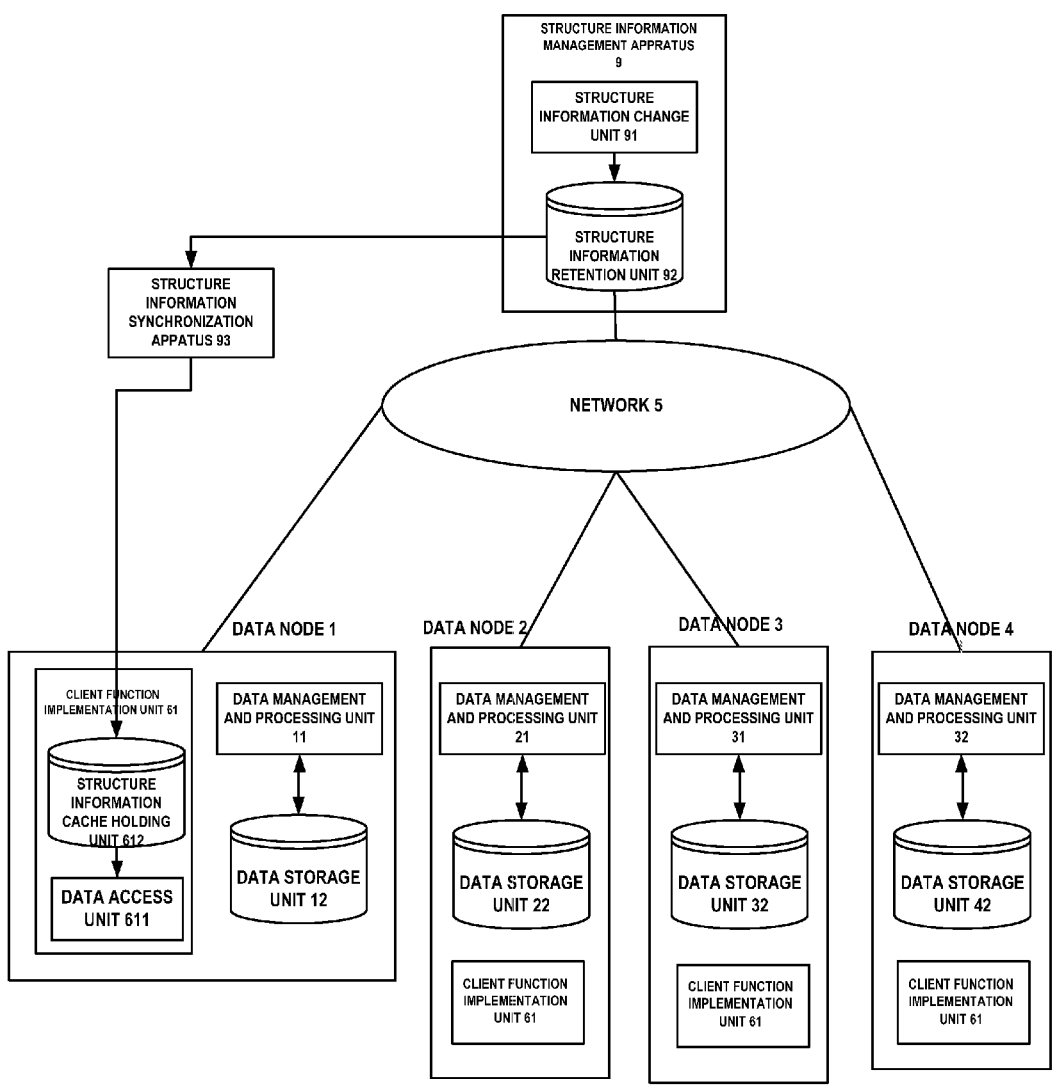
FIG. 2 is a diagram explaining the first exemplary embodiment of the present invention.

FIG. 2 is a diagram illustrating a configuration of a variation example of the first exemplary embodiment of the present invention. As shown in FIG. 2, the client function implementation unit 61 is disposed at each of the data nodes 1, 2, 3, and 4.

Referring to FIG. 2, the client function implementation unit 61 includes a structure information cache holding unit 612, in addition to the data access unit 611 shown in FIG. 1.

The structure information cache holding unit 612 is the cache memory configured to store the part or all of the structure information stored in the structure information retention unit 92.

Structure information synchronization apparatus 93 controls synchronization of the cache for the structure information. The structure information synchronization apparatus 93 obtains data in the structure information retention unit 92, and updates the information in the structure information cache holding unit 612 of the client function implementation unit 61 of the data node.

An arbitrary number of the structure information synchronization apparatus 93 may be included in an arbitrary device that constitutes the system. To take an example, the structure information synchronization apparatus 93 may be run as software on a computer that implements at least one of the respective data nodes 1 to 4.

Figure 3:
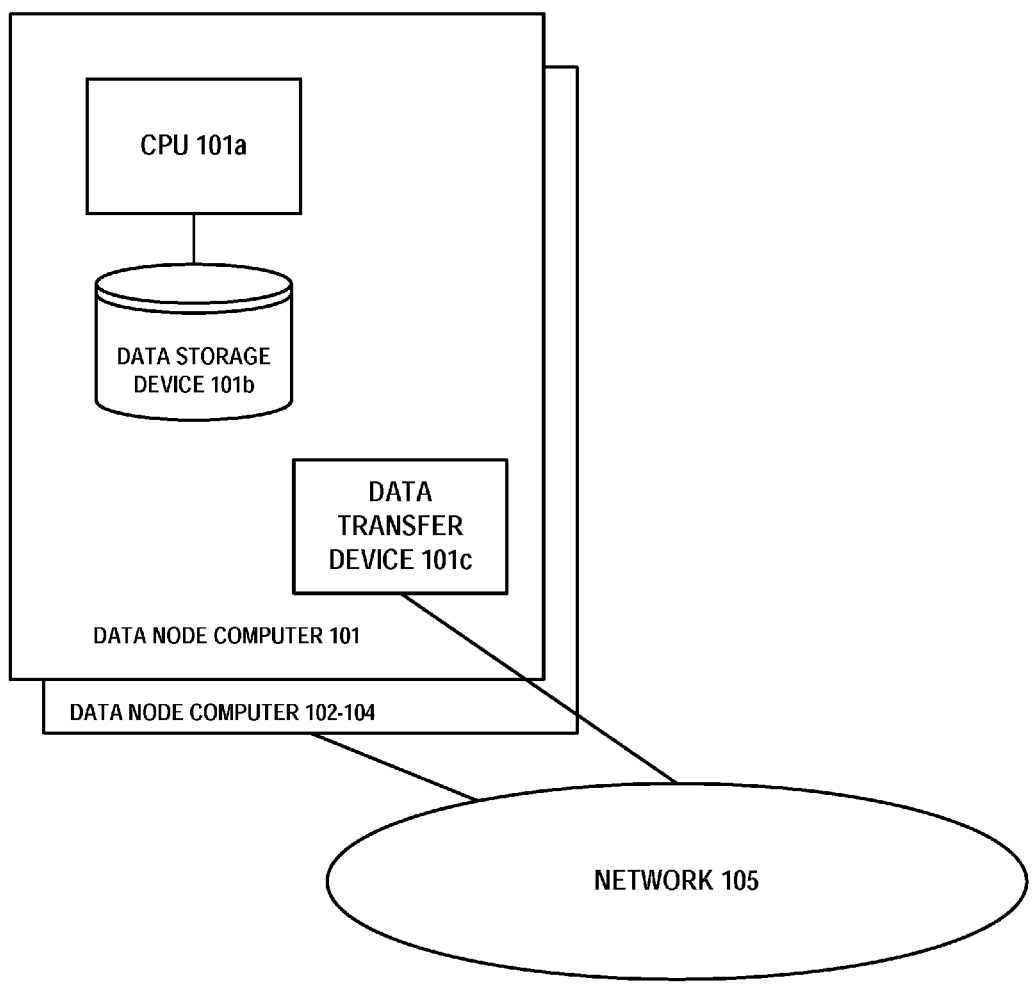
FIG. 3 is a diagram explaining the first exemplary embodiment of the present invention.

An example where each of the data nodes 1 to 4 in FIG. 2 is implemented as the individual computer is shown in FIG. 3. The example in FIG. 3 is constituted from one or an arbitrary number of data node computers 101 to 104 and a network 105.

Each of the data node computers 101 to 104 includes a CPU 101*a*, a data storage device 101*b*, and a data transfer device 101*c*. All or a part of functions of the data management and processing unit 11 and the client function implementation unit 6 is implemented by the CPU 101*a*.

The data storage device 101*b* is, for example, a hard disk drive, a flash memory, a DRAM (Dynamic Random Access Memory), an MRAM (Magnetoresistive Random Access Memory), an FeRAM (Ferroelectric Random Access Memory), a PRAM (Phase change RAM), a storage device connected to RAID controller, a physical medium such as a magnetic tape that can record data, or a control apparatus configured to record data in a medium installed outside each storage node. The network 105 and the data transfer device 101*c* can be implemented by Ethernet (trade mark), Fibre Channel or FCoE (Fibre Channel over Ethernet (trade mark)), InfiniBand (high-speed IO bus architecture promoted by an organization including Intel Corporation and other vendors), QsNet (product of Quadrics Ltd.), Myrinet (product of Myricom, Inc.), Ethernet (registered trade mark), or a high-order protocol such as TCP/IP (Transmission/Control Protocol/Internet Protocol) or RDMA (Remote Direct Memory Access) that uses these protocols. However, a method of implementing the network 105 is not limited to use of these protocols. As an example where the network 105 and the data transfer device 101*c* are implemented by Ethernet (registered trademark), the data transfer device 101*c* is constituted from a network card connected to the computer, and the network 105 is constituted from an Ethernet (registered trademark) cable, a switch, and the like.

Each of the data nodes 1 to 4 may be implemented by a virtualized computer (Virtual Machine). As a typical example, there is VMWare (product of VMWare, Inc.), or Xen (trademark of Citrix Systems, Inc.)

<Example of Details of Data Node>

Figure 4:
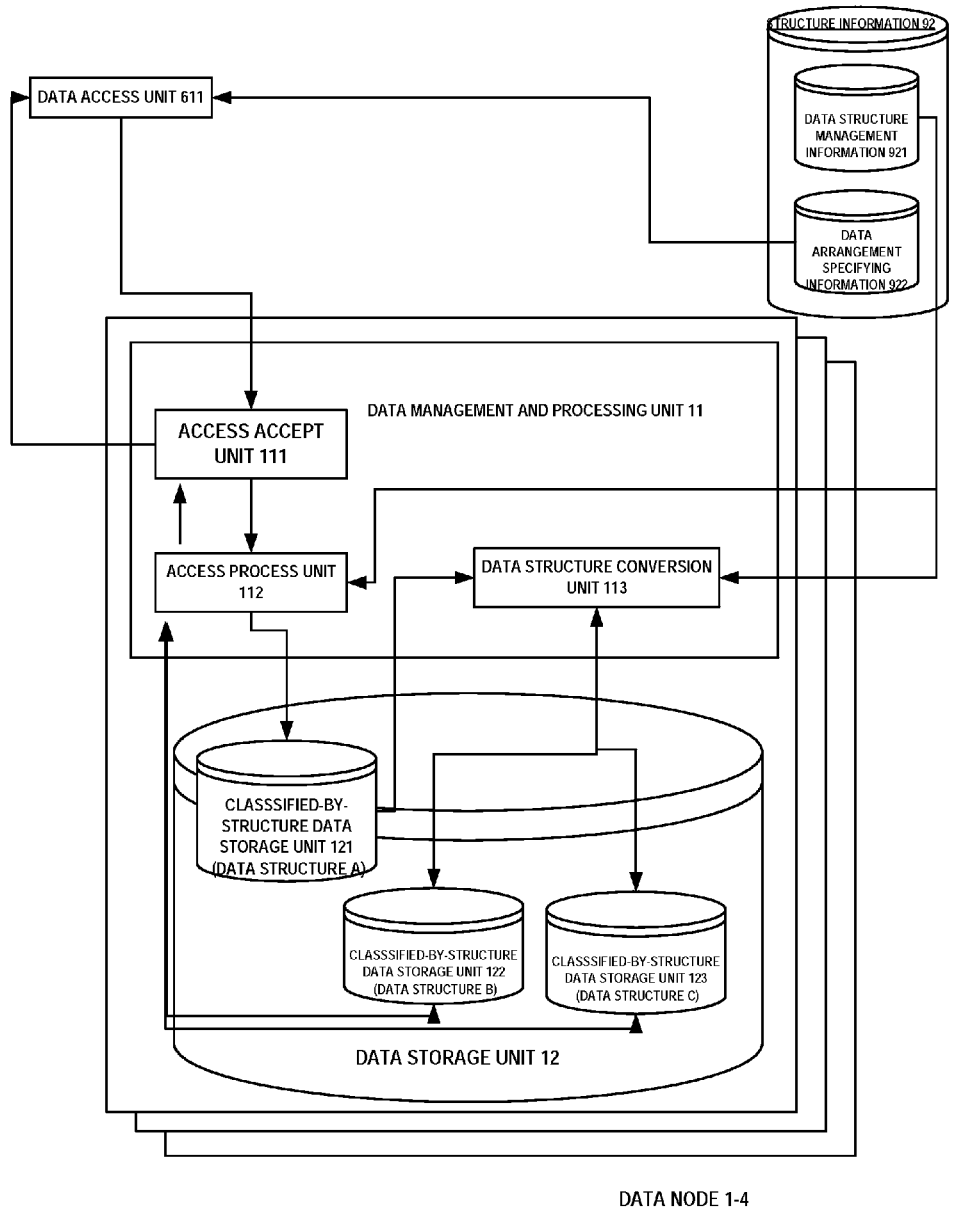
FIG. 4 is a diagram illustrating an example of a configuration of a data mode in the first exemplary embodiment of the present invention.

FIG. 4 is a diagram explaining a configuration example of the first exemplary embodiment of the present invention in more detail. In FIG. 4, there is shown a configuration where the data nodes 1 to 4 in FIG. 1 are shown at the center. For simplicity, the structure information stored in the structure information retention unit 92 in a drawing such as FIG. 4 may be referred to by reference sign 92.

The data management and processing unit 11 of the data node includes access accept unit 111, access process unit 112, and data structure conversion unit 113.

The access accept unit 111 receives an access request from the data access unit 611, and returns a response to the data access unit 611 after completion of the process.

The access process unit 112 performs an access process on a data storage unit 12X (X=1, 2, or 3), using the structure information in the structure information retention unit 92 (or the information held in the cache at the arbitrary location).

The data structure conversion unit 113 performs data conversion for the classified-by-structure data storage unit 12X (X=1, 2, or 3) using data in a classified-by-structure data storage unit 121 for each certain trigger.

The data storage unit 12 includes a plurality of types of classified-by-structure data storage units. Referring to FIG. 4, the data storage unit 12 includes the classified-by-structure data storage unit 121 (for a data structure A), the classified-by-structure data storage unit 122 (for a data structure B), and the classified-by-structure data storage unit 123 (for a data structure C).

Any type of data structure can be selected on a per classified-by-structure data storage unit 12X (X=1, 2, or 3) basis.

In this exemplary embodiment, the classified-by-structure data storage unit 121 (for the data structure A, for example) takes a structure specialized in response performance for a process involving data writing (addition or update of data). Specifically, software for holding content of data modification in a high-speed memory (such as a dual port RAM) as a queue (of a FIFO (First In First Out) data structure, for example), software for adding content of an access request process to an optional storage medium as a log is implemented. Each of the data structure B and the data structure C is different from the data structure A. The data structure B and the data structure C have data access characteristics different to each other.

The data storage unit 12 does not necessarily need to be a single storage medium. A system may be employed where the data storage unit 12 in FIG. 4 is implemented as a distributed storage system comprising a plurality of data arrangement nodes, and each classified-by-structure data storage unit 12X is distributed for storage.

The data arrangement specifying information 922 is information for identifying data to be stored in the distributed storage or the storage destination of a data piece (and unit that stores and obtains the information). As described above, a metaserver scheme or a distributed KVS scheme is generally used as a method of data distribution and arrangement.

In the case of the metaserver scheme, information for managing location information of data (such as a block address and a data node address associated with the block address) is the data arrangement specifying information 922. The metaserver can identify the arrangement destination of necessary data, by referring to this information (metadata).

In the case of the distributed KVS scheme, a list of the nodes participating in the system corresponds to this data arrangement specifying information. By using an identifier for storage of data and information of the list of the nodes, the data node of the storage destination of the data can be determined.

The data access unit 611 identifies one of the data nodes 1 to 4 to be accessed, using the data arrangement specifying information 922 in the structure information management unit 9 or the information of the data arrangement specifying information 922 held in the cache at the predetermined location set in advance. Then, the data access unit 611 issues an access request to the access accept unit 111 of the data node.

<Data Structure Management Information>

The data structure management information 921 is parameter information for specifying a data storage format for each data group. FIGS. 5A and 5B are tables showing an example of the data structure management information 921 in FIG. 4. Though no particular limitation is imposed, a unit of controlling the data storage format is set to a table in this exemplary embodiment. Then, the number of pieces of information corresponding to the number of replicas of data is provided for each table (for each table identifier). Each piece of information is formed of the replica identifier, the type of the data structure, and the 0.

Referring to FIG. 5A, each table holds three replicas in order to ensure (maintain) availability. The replica identifier is information for identifying each replica. Referring to FIG. 5A, the replica identifier is given in the form of 0, 1, or 2.

The data structure is information indicating the storage format of data. Referring to FIG. 5A, the different formats indicated by three types of the data structures (A, B, and C) are specified for each replica identifier.

FIG. 5B shows examples of the data structures A, B, and C. As types of the data storage formats, the following data storage formats are specified:

A: Queue
B: Row-Store
C: Colum-Store

In this case, data with the replica identifier of 0 associated with the table identifier of "Stocks" is stored as the (row-store) data structure B.

Each of the data structures is the format of storing data.
A: queue (Queue) is a linked list (Linked List).
B: row-store (ROW STORE) is the format of storing table records in the order of rows (ROWs).
C: column-store (COLUMN STORE) is the format of storing the table records in the order of columns (COLUMNs).

FIG. 6 illustrates an example of a data retention structure of a table. The table in FIG. 6A includes a Key column and three pieces of Value columns. Each row is formed of a set of Key and three Values.

Column-store and row-store respectively indicate the storage format for column (column)-based storage on a storage medium and the storage format for row (row)-based storage on the storage medium, as shown in FIG. 6.

FIGS. 6A to 6B describe the storage formats for the table (see FIG. 6A), in which:
data with the replica identifier of 0 or 1 is held in the (row-store) data structure B (see FIGS. 6B and 6C), and
data with the replica identifier of 2 is held in the (column-store) data structure C (see FIG. 6D).

Referring to FIG. 5A again, the update trigger in the data structure management information 921 (see FIG. 4) is a timing trigger indicating a period until data is stored as a specified one of the data structures. In the example of the replica identifier of 0 associated with the table identifier of "Stocks", the update trigger is specified as 30 seconds. This therefore indicates that, in the data node configured to store the (row-store) data structure B corresponding to the replica identifier of 0 associated with the identifier of Stocks, an update of data is reflected in the classified-by-structure data storage unit 122 using the row-store format in 30 seconds. The data is held as an intermediate structure such as the queue until update of the data is reflected. In the data node, a request from a client is stored in the intermediate structure and a response is made. In this exemplary embodiment, conversion to the specified data structure is performed in an asynchronous (Asynchronous) manner with an update request.

Figure 7:
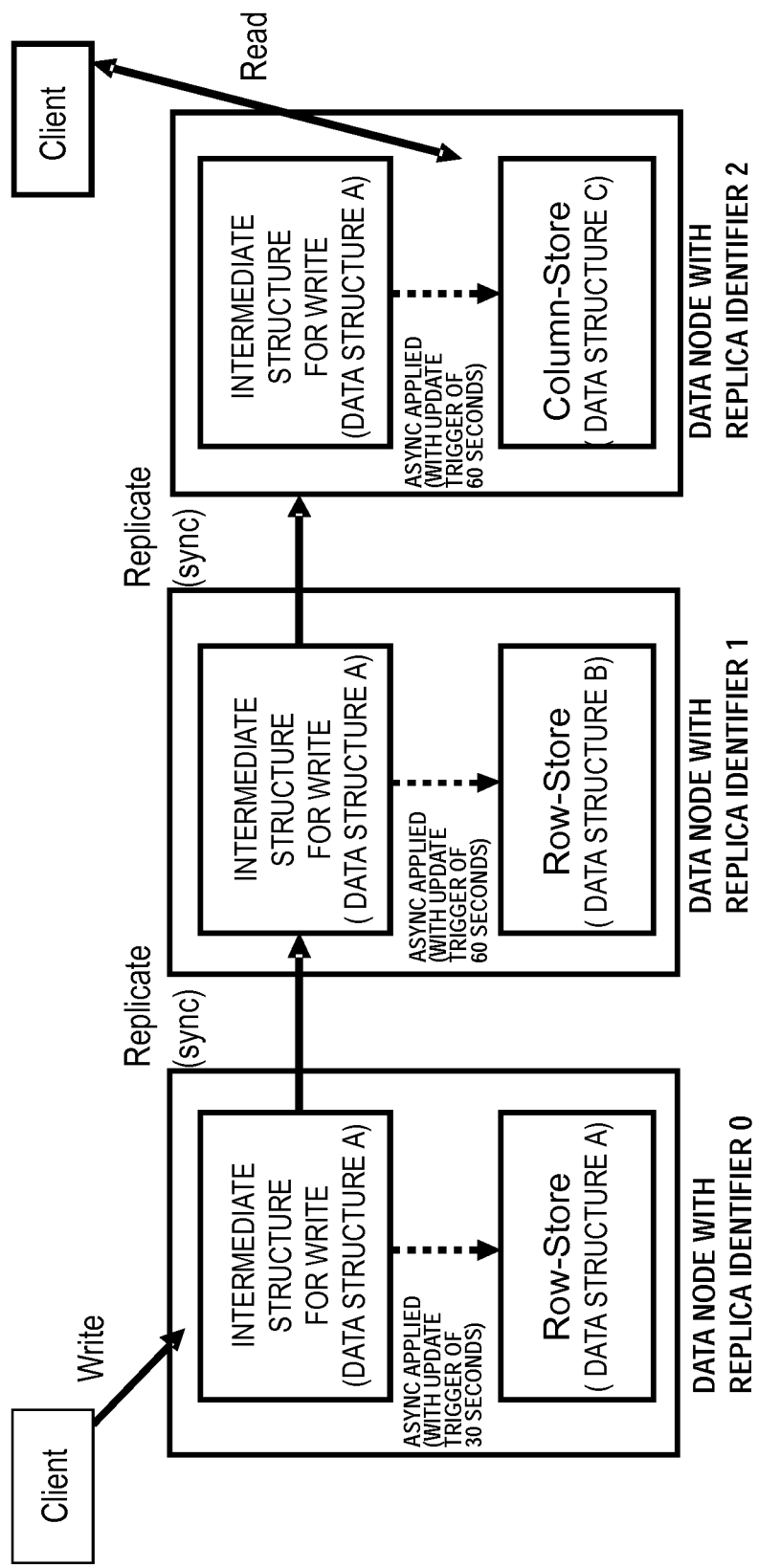
FIG. 7 is a diagrams schematically explaining holding and asynchronous updating of table data in the first exemplary embodiment of the present invention.

FIG. 7 is a diagram schematically explaining holding and asynchronous updating of table data. In case the update trigger is larger than "0", each data node includes a structure excellent in a response speed for a Write (update request), as an intermediate structure, and accepts update content. When the data node performs writing into the intermediate structure, the data node returns the response indicating completion of the process to the client of the update request source.

The update data written to the intermediate structure (also referred to as an intermediate structure for Write, a Write-precedence intermediate structure, or an "intermediate data retention structure") in each data node is subject to an asynchronous (Async) update to the data structure B or C in each data node. In the example shown in FIG. 7, the data structure A is stored and held in the intermediate structure for Write in the data node associated with the replica identifier of 0, by a Write. Then, the data of the data structure A held in the intermediate structure for Write is replicated (replicated) to the data node associated with the replica identifier of 1 and the data node associated with the replica identifier of 2 in a synchronous (Synchronous) manner. The data of the data structure A is then temporarily stored and held in the intermediate structure for Write in each of the data nodes associated with the replica identifiers of 1 and 2. Conversions of the target to the data structure B, to the data structure B, and to the data structure C in the data nodes respectively corresponding to the data structures associated with the replica identifiers of 0, 1, and 2 are specified by update trigger information in the data structure management information 921 as shown in FIG. 5A.

As shown in FIG. 7, the replication of the update data (of the data structure A) written to the intermediate structure for Write in one data node are performed between the data nodes in a synchronous (Sync) manner with the Write (update). With such an arrangement, a Write response speed of Write (write) data, to which an immediate READ (read) access is not made, can be enhanced.

Further, when a (subsequent) READ access is made, the write data is already converted to the data structure necessary for the READ access. Thus, by processing the READ access using the converted data structure, the speed up of the process can be achieved. Further, according to the type of a READ access, the data structure that is appropriate for the type of the READ access can also be selected, and a proper use of the node of an access destination can also be made.

In this exemplary embodiment, the number of the types of the data structures was set to three, just for the sake of simplicity of the description. The number of the types of the data structures is not, as a matter of course, limited to three, and arbitrary plural types of the data structures having different characteristics may be employed. Three types of examples of the data structures, which are the queue data structure, the column-store data structure, and the row-store data structure, were exemplified. Naturally, the data structures were not limited to those examples. Data structures as follows, for example, may be employed:

presence or absence of an index in a row-store data structure;

difference of types of columns with indices generated therefore; and row-store format in which an update is stored as an append-structure.

As a system different from the example shown in FIG. 5, in place of the type of the data structure, a data storage program may be specified in the data structure management information 921. To take an example, a program A configured to store data in the queue as the data structure A in FIG. 5A is specified, and different database software for each of the data structures B and C in FIG. 5A is specified. In this case, in the data node configured to store the replica identifier associated with the table, for which the data structure A is specified, received data is processed by executing the program A.

<Data Arrange Identification Information>

FIG. 8 shows an example of the data arrangement specifying information 922 in FIG. 4. The arrangement node to arrange data is specified for each of the replica identifiers of 0, 1, or 2 associated with each table identifier. This arrangement is associated with the above-mentioned metaserver scheme.

<Distributed KVS>

In the case of the distributed KVS scheme, the data arrangement specifying information 922 corresponds to node list information (not shown) of nodes participating in the distributed storage. By sharing this node list information among the data nodes, the arrangement node can be identified by a consistent hashing scheme, using "table identifier"+"replica identifier" as key information. Further, a replica of the data can be stored in the node adjacent to the node identified by the consistent hashing scheme, as a destination for allocating the replica. The consistent hashing scheme will be described in a fourth exemplary embodiment.

Referring to FIG. 8 again, in the data arrangement specifying information 922, each arrangement node must be so specified that the same table is not held singly in the same node in order to guarantee availability.

To take an example, the arrangement nodes for the replica identifiers of 0, 1 and 2 of the Stocks table must not be overlapped to each other. When the availability is not taken into consideration, this limitation is not necessarily applied. That is, a plurality of types of replicas may be held in the same node.

<Write Process Sequence>

Figure 9:
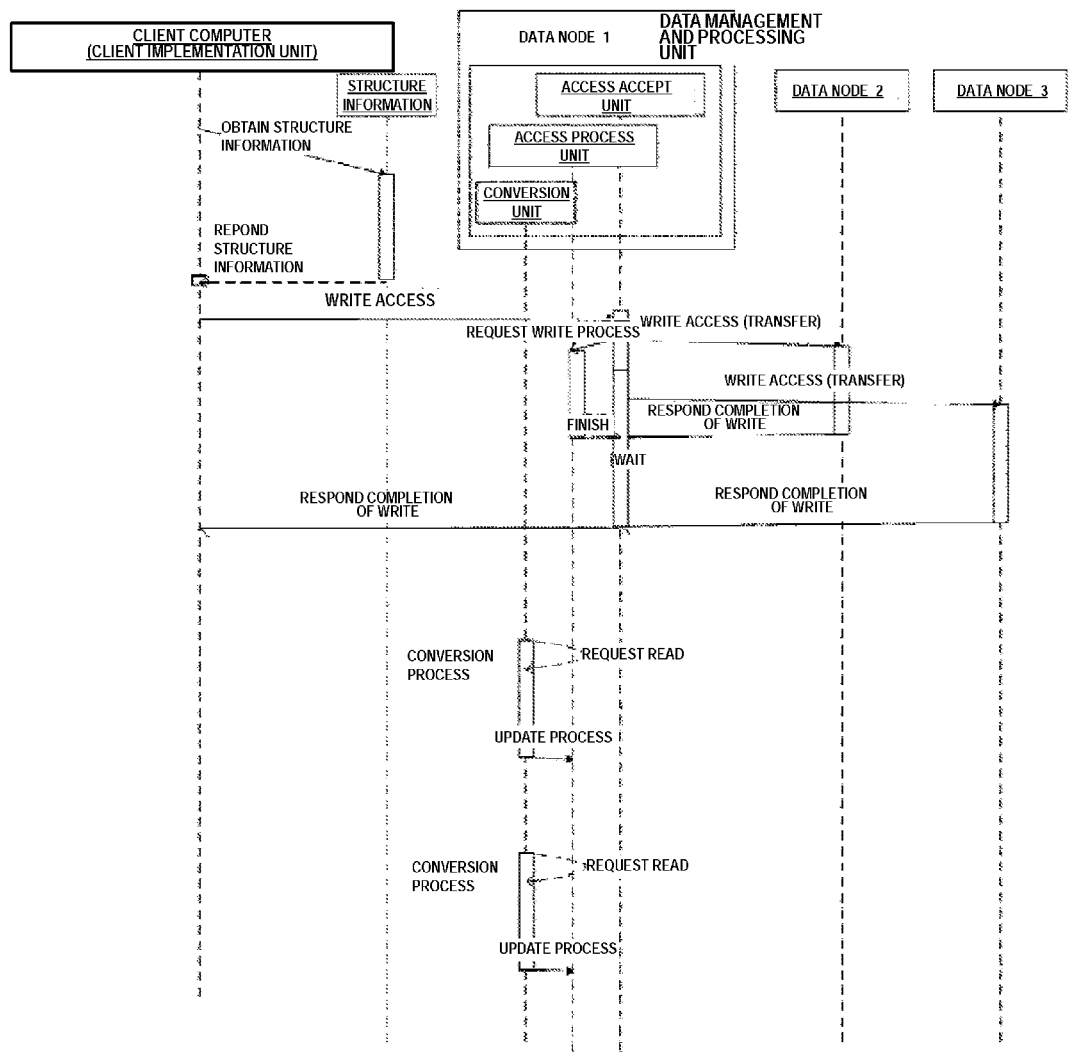
FIG. 9 is a diagram (1) explaining an operation sequence of a Write process in the first exemplary embodiment of the present invention.

Operation of the first exemplary embodiment of the present invention will be described. FIG. 9 is a diagram illustrating a sequence of a Write process (process involving an update) in the first exemplary embodiment of the present invention described with reference to FIGS. 1 to 8.

The client function implementation unit 6 obtains information in the data arrangement specifying information 922 (see FIGS. 4 and 8) held in the structure information retention unit 92 of the structure information management unit 9 (or obtains the information from a cache memory provided at an arbitrary location).

The client function implementation unit 61 issues a Write access instruction to the data node of the arrangement destination of data of which the Write process is to be performed (data node 1 associated with the replica identifier 0 in FIG. 9), using the obtained information.

The access accept unit 111 of the data node 1 receives the Write access request (Write process request), and transfers the Write access to the data nodes 2 and 3, specified by the replica identifiers 1 and 2. As a method of identifying the data nodes specified by the replica identifiers 1 and 2, the data node 1 may access the structure information retention unit 92 (or the appropriate cache). Alternatively, all or a part of information in the data structure management information 921 may be delivered to the Write access instruction issued by the client implementation unit 61.

The access process unit 112 of each data node processes the received Write access request.

The access process unit 112 executes the Write process by referring to the information in the data structure management information 921.

When the update trigger is larger than "0", the access process unit 112 stores content of the Write process in the classified-by-structure data storage unit 121 for the data structure A.

When the update trigger is "0", the access process unit 112 stores the content of the Write process in the classified-by-structure data storage unit 12X for the data structure specified in the data structure management information 921.

After completion of the Write process, the access process unit 112 issues a notification of the completion to the access accept unit 111.

Each of the data nodes (2, 3) of replica destinations returns a response indicating completion of the Write to the access accept unit 111 of the data node 1 of the replica source.

The access accept unit 111 waits for the notification of the completion from the access process unit 112 of the data node 1 and the notification of the completion from each of the data nodes 2 and 3 of the replica destinations. After the access accept unit 111 receives all of the notifications, the access accept unit 111 returns a response to the client function implementation unit 61.

The data structure conversion unit 113 (see FIG. 4) periodically performs conversion of data in the classified-by-structure data storage unit 121 (for the data structure A) and stores the converted data in the classified-by-structure data storage unit 12X (for the data structure of a final storage destination specified in the data structure management information 921).

In the example in FIG. 9, the data node 1 transfers the Write access to the data nodes 2 and 3 of replica destinations. However, the client function implementation unit 61 may issue the Write access to each of the data nodes of storage destinations, as shown in FIG. 10.

Figure 10:
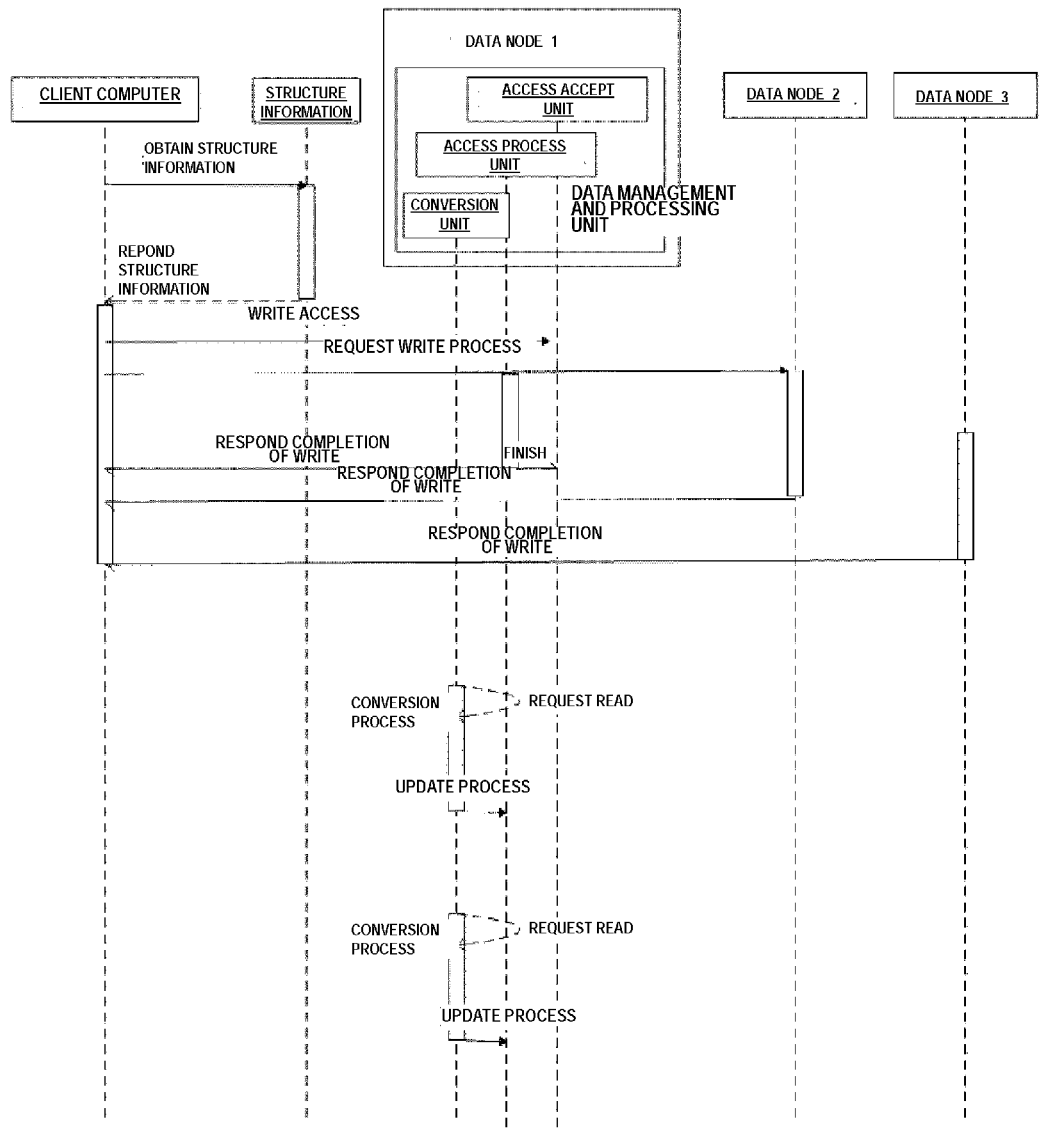
FIG. 10 is a diagram (2) explaining an operation sequence of the Write process in the first exemplary embodiment of the present invention.

The example in FIG. 10 is different from the example in FIG. 9 in that the client function implementation unit 61 performs waiting for a Write access request.

<Reference-oriented Process Sequence>

Figure 11:
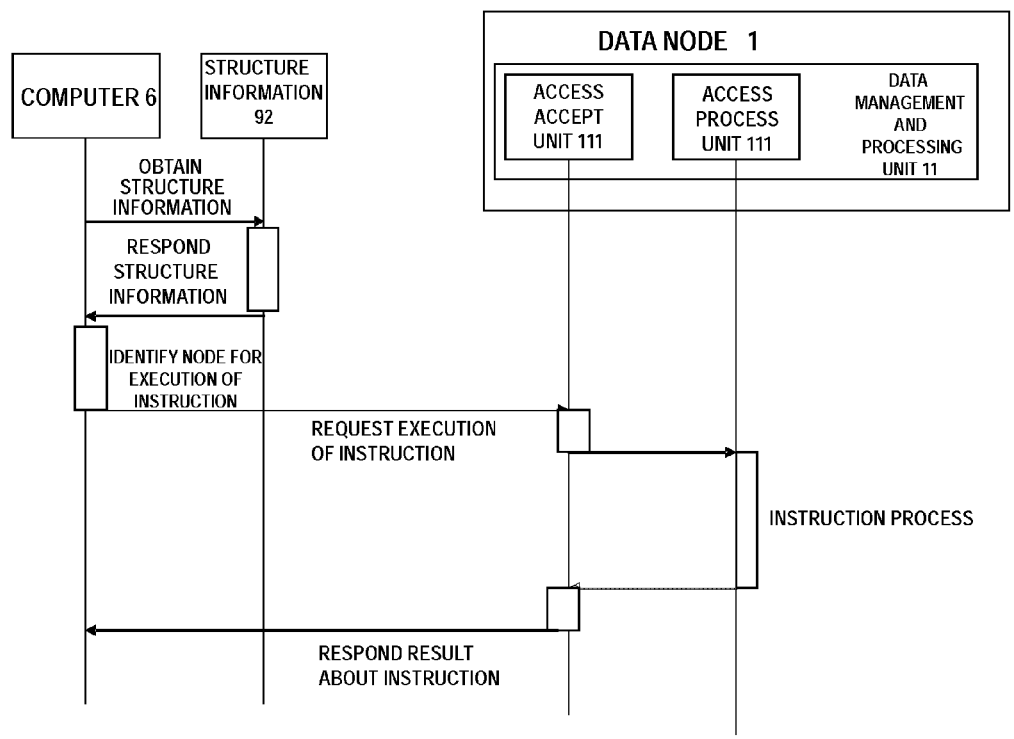
FIG. 11 is a diagram explaining an operation sequence of a Read process in the first exemplary embodiment of the present invention.

FIG. 11 is a diagram illustrating a reference-oriented process (READ process) in the first exemplary embodiment of the present invention.

The client computer (client node) 6 obtains information in the data structure information management information 921 to identify the node of an instruction execution destination. Any one of the replica identifiers may be used for the node to for allocating replica data. However, it is desirable to select an appropriate one of the nodes, according to the process to be performed.

The reference-oriented process indicates a process involving data reading, and corresponds to an instruction using a Select sentence in an SQL (Structured Query Language) sentence or the like, for example.

In case data is read from a certain table A and
an operation result using the data is updated to a table B,
the data reading from the table A corresponds to the reference-oriented process.

Alternatively, in the case of the process where the table A is updated after the table A has been referenced, the process may be collectively treated as the Write process (described with reference to FIGS. 9 and 10). Alternatively, the process of referencing the table A may be treated as the reference-oriented process, and the update of the table A may be treated as an update process.

<Operation of Client Function Implementation Unit>

Figure 12:
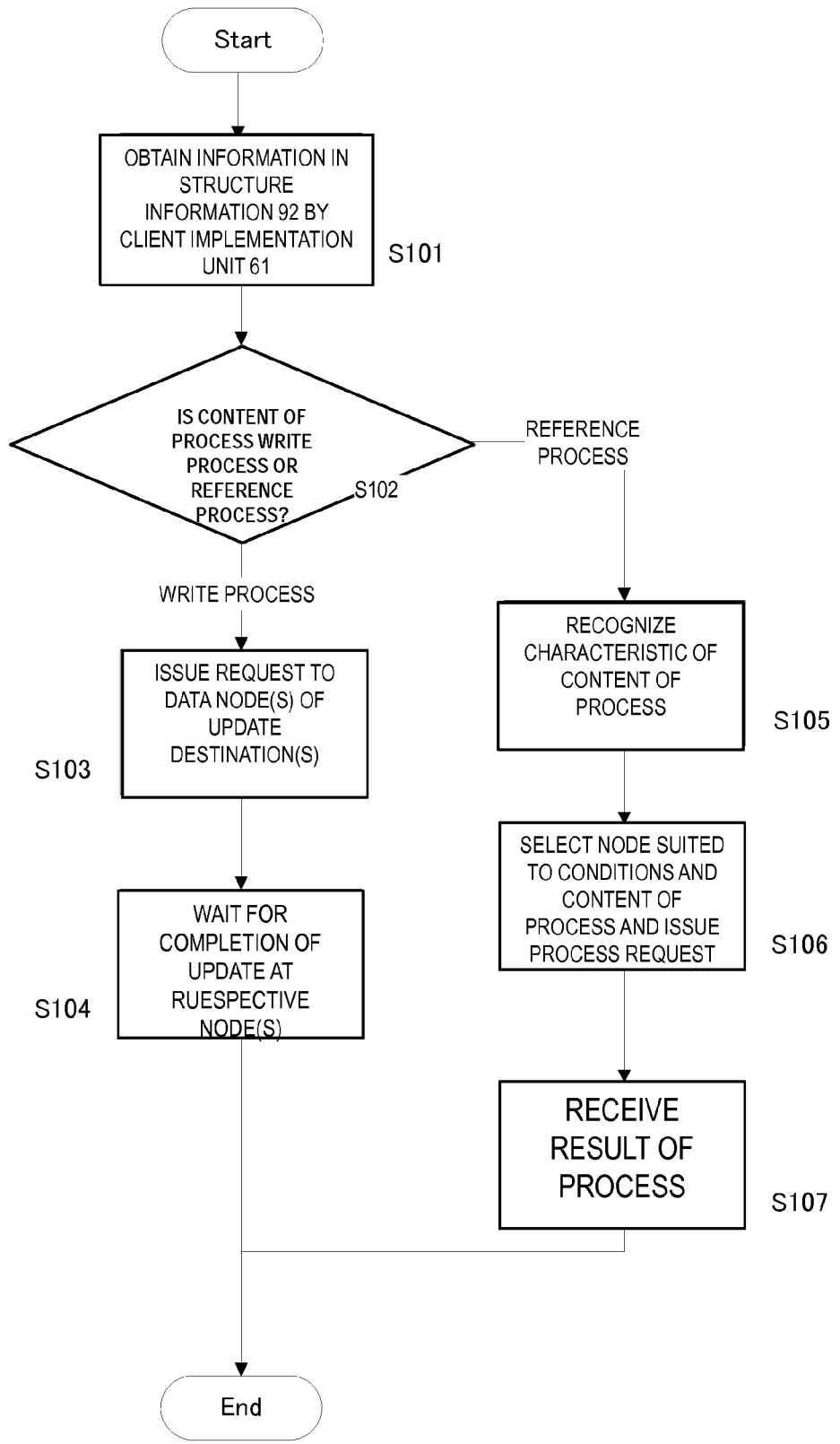
FIG. 12 is a flowchart explaining access process operations by client implementation unit 61 in the first exemplary embodiment of the present invention.

FIG. 12 is a flowchart explaining access process operations in terms of the client function implementation unit 61. An access flow of the client will be described with reference to FIG. 12.

First, the client function implementation unit 61 obtains information in the structure information retention unit 92 by accessing master data or accessing a cache provided at an arbitrary location (in step S101 in FIG. 12).

Next, the client function implementation unit 61 makes a distinction whether content of an instruction issued by the client indicates the Write process or the reference (Read) process (in step S102).

This distinction can be identified by specification by the command of the issued instruction or analyzing the execution code of the instruction. To take an example, in the case of a storage system configured to process SQL, the distinction can be identified by:

an INSERT instruction (SQL instruction for adding a record to a table) indicating the Write process; and a SELECT instruction (SQL instruction for deleting a record from a table) indicating the reference-oriented process.

Alternatively, when the instruction is invoked using the client function implementation unit 61, the type of the process may be explicitly specified (API (Application Program Interface) for achieving such a function is provided).

When it is identified as a result of step S102 that the content of the issued instruction indicates the Write process, the procedure proceeds to step S103 and subsequent steps.

In the case of the Write process, the client function implementation unit 61 identifies one or more of the nodes for which update is needed, using information in the data arrangement specifying information 922. This process is as described with reference to FIG. 9.

The client function implementation unit 61 issues a request for executing the instruction (update request) to the one or more identified nodes (in step S103).

The client function implementation unit 61 waits for a notification of a response from each data node to which the update request has been issued to confirm that the update request has been held in each data node (in step S104).

FIG. 12 is the flowchart for explaining the operations of the client function implementation unit 61 corresponding to the sequence of issuing the instruction to each data node of the update destination and then waiting for the notification of the response.

When it is identified as a result of step S102 that the content of the issued instruction indicates the reference-oriented process, the procedure proceeds to step S105.

In step S105, the client function implementation unit 61 first identifies (recognizes) a characteristic of the content of the process (in step S105).

The client function implementation unit 61 selects the data node to be accessed, in consideration of the identified process characteristic and other system situations, and performs the process of issuing an instruction request (in step S106).

Then, the client function implementation unit 61 receives a result of the access process from the data node (in step S107).

A description about the processes of the steps S105 and S106 will be supplemented below.

The client function implementation unit 61 can first grasp the type of the data structure in which data to be accessed is held, based on information stored in the data structure management information 921. In the case of the example in FIG. 5A, for example, when an access is made to the WORKERS table, the replica identifiers of 0 and 1 indicate the data structure B, while the replica identifier of 2 indicates the data structure C.

The client function implementation unit 61 determines to which data structure the data access performed to the data node is suited, and then selects an appropriate data structure.

More specifically, the client function implementation unit 61 analyzes an SQL sentence for the access request, for example. When the instruction is an instruction to extract the sum of data in a certain column in the table with the table identifier of "WORKERS", the client function implementation unit 61 selects the data structure C (column-store). When the instruction is an instruction to extract a specific record, the client function implementation unit 61 determines that the data structure B (row-store) is more suited.

When the instruction is the one to extract the specific record, any one of the replica identifiers of 0 and 1 may be selected. When there is necessarily "no need for performing the process using the data at the most recent time", it is desirable that the replica identifier of 1 (with the update trigger of 30 seconds) be employed.

Specifying that there is "no need for performing the process using the data at the most recent time" depends on an application context. For this reason, it may be so arranged that the instruction to be transferred to the client function implementation unit 61 has a format that explicitly specifies data structure to be used and a degree of freshness (newness) of the necessary data.

After identifying the replica identifier (data structure) to be accessed, the client function implementation unit 61 computes the data node to be accessed. In this case, selection of the node to be accessed may be changed according to a situation of the distributed storage system. To take an example, In case when a certain table is stored in each of the data nodes 1 and 2, as the same data structure B, an access load on the data node 1 is large, the selection may be changed to an operation of selecting the data node 2.

Assume that the certain table is stored in the data node 3 as the different data structure C. Then, when an access load on the data node 3 is smaller than that of the data node 1 and that of the data node 2, the access request may be issued to the data node 3 (that stores the data structure C), even if the access content to be processed is more suited to the data structure B.

The client function implementation unit 61 issues the access request to the data node that has been thus calculated and selected (in step S106), and receives the result of the access process from the data node (in step S107).

<Operations of Data Node>

Figure 13:
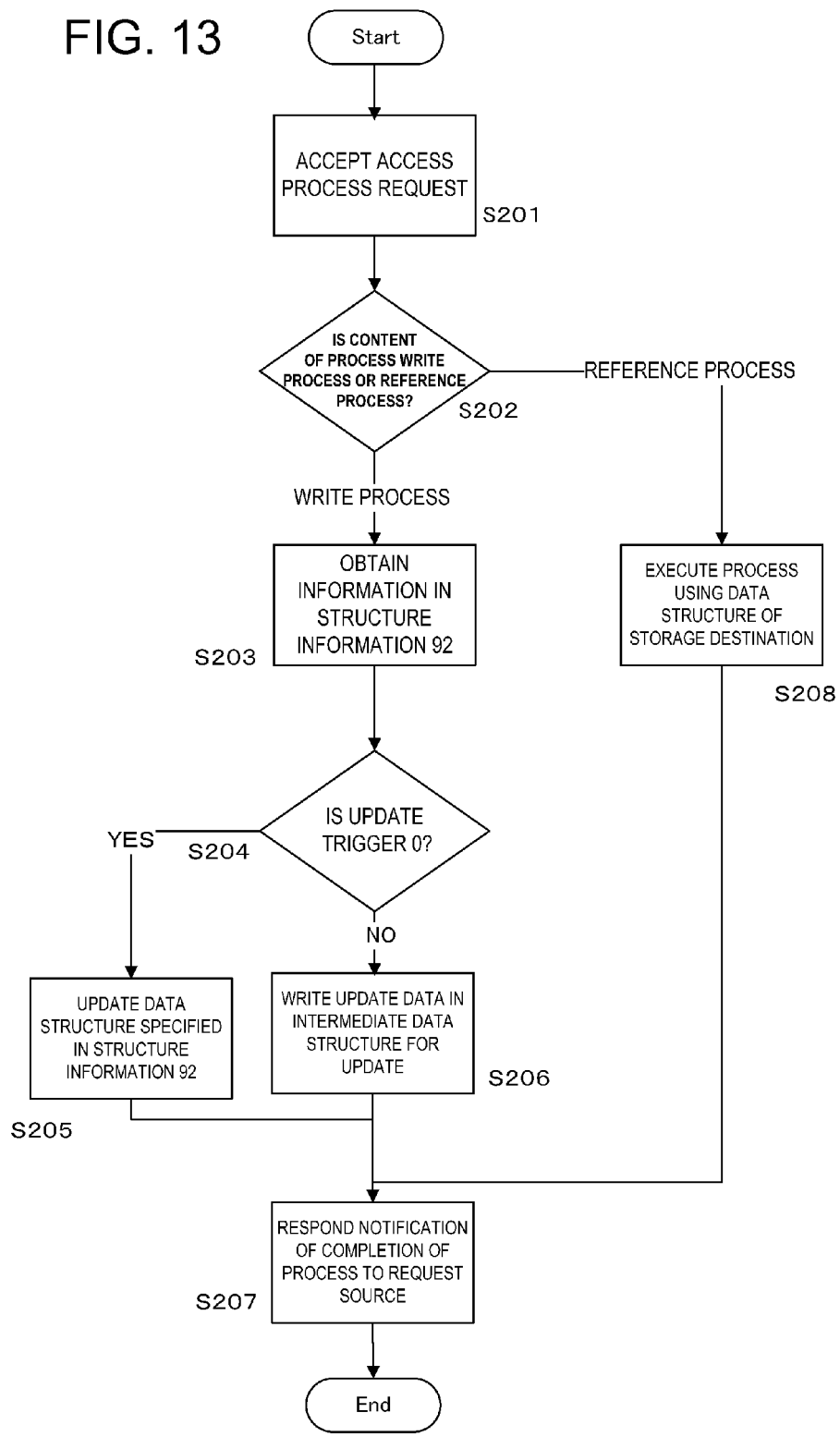
FIG. 13 is a flowchart explaining access process operations of a data node in the first exemplary embodiment of the present invention.

FIG. 13 is a flowchart explaining an access process on the data node shown in FIG. 4. Operations of the data node will be described in detail with reference to FIGS. 13 and 14.

First, the access accept unit 111 of the data management and processing unit 11 at the data node accepts an access process request (in step S201 in FIG. 13).

Next, the access accept unit 111 of the data management and processing units 11 at the data node determines whether content of the process request accepted is the Write process or the reference process (in step S202).

When it is determined as a result of step S202 that the content of the received process request is the Write process, the access process unit 112 of the data management and processing units 11 at the data node obtains information in the data structure management information 921 in the structure information retention unit 92 (in step S203). The information in the data structure management information 921 may be obtained by accessing master data, or by accessing data in a cache provided at an arbitrary location. Alternatively, the client function implementation unit 61 shown in FIG. 1 or FIG. 2 may give information (indicating access to the master data or the data in the cache) to the request to be issued to the data node, and the access process unit 112 may make the access, using that information.

Next, the access process unit 112 determines whether or not the update trigger for the process on the data node is "0" (zero), using the information in the data structure management information 921 (in step S204).

In case a result of step S204 indicates that the update trigger is "0", the access process unit 112 directly updates the data structure specified in the structure information in the structure information retention unit 92 (in step S205). That is, the access process unit 112 converts update data to the data structure specified, and stores the converted data in a corresponding one of the classified-by-structure data storage units 12X (X=1, 2, and 3).

In case the update trigger is not "0", the access process unit 112 stores the update data in the intermediate structure for Write (classified-by-structure data storage unit 121) (in step S206).

In each of the cases of steps S205 and 206, the access accept unit 111 responds a notification of completion of the process to the client implementation unit 61 of the request source after completion of the process (in step S207).

In case a result of step S202 indicates that the content of the process request accepted is the reference process of data, the reference oriented process is executed (in step S208).

Though no particular limitation is imposed, the following three types of methods can be typically pointed out, as a method of executing the reference oriented process:

(1) A first method is to perform the process using data in the data storage unit for the data structure specified in the data structure management information 921. This method shows the most excellent performance. However, when the update trigger is large, data in the intermediate structure for Write may not be reflected on the reference oriented process. For this reason, a data mismatch may occur. However, there is no problem in particular when an application developer recognizes this possibility in advance and uses the data in the intermediate structure for Write, when it is known that data reading after a Write will not occur within the update trigger, or it is determined that access to data with the replica identifier of "0" is to be made if a new data access is needed.

(2) A second method is to perform the process, after waiting for application of the conversion process to be performed separately. Implementation of this method is easy, but response performance is degraded. In the case of an application that does not require the response performance, there is no problem.

(3) A third method is to perform the process by reading both of the data structure specified in the data structure management information 921 and the data held in the intermediate structure for Write. In this case, the data at the most recent time can be constantly responded. However, this method shows performance inferior to the first method.

Any one of the first to third method described above may be employed. Alternatively, a plurality of the types of methods may be implemented, and may be described as setting files of the system. Alternatively, the method to be executed may be specified in the instruction for the process to be issued from the client function implementation unit 61.

<Conversion Operation of Data Structure Conversion Unit>

Figure 14:
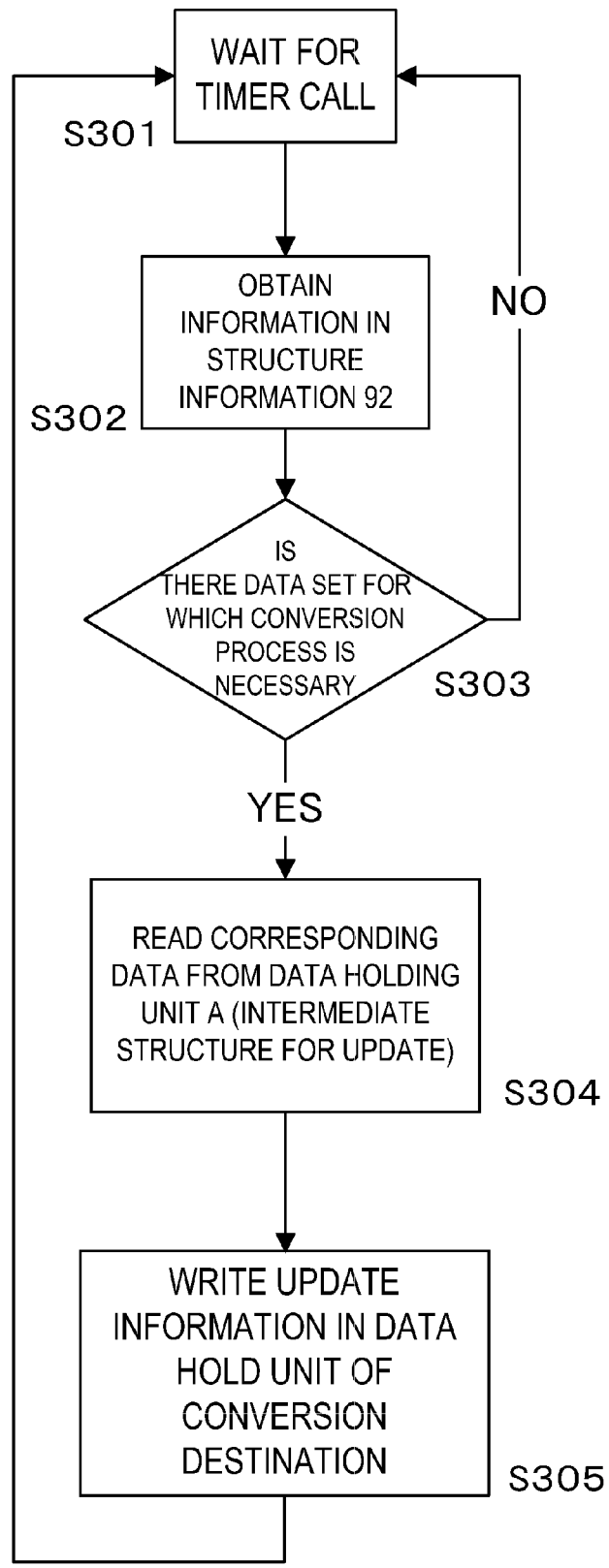
FIG. 14 is a flowchart explaining a data conversion process in the first exemplary embodiment of the present invention.

FIG. 14 is a flowchart showing operations of a data conversion process to be performed by the data structure conversion unit 113 in FIG. 4. The data conversion process will be described, with reference to FIGS. 14 and 4.

The data structure conversion unit 113 waits for a call from a timer (not shown in FIG. 4) within the data node due to occurrence of a timeout, in order to periodically determine whether or not it is necessary to perform the conversion process (in step S301 in FIG. 14). This timer may be included in the data structure conversion unit 113 as a dedicated timer. The timeout period is associated with each update trigger (seconds) shown in FIG. 5A.

Next, the data structure conversion unit 113 obtains the structure information (data information) in the structure information retention unit 92 (in step S302), and determines whether there is the data structure for which conversion is necessary (in step S303). Assume, for example, that determination by the timer is made for each 10 seconds. Then, assume that the conversion process of the data structure whose update trigger is set to 20 seconds is performed for each 20 seconds. Thus, the conversion process does not need to be performed on the data structure whose update trigger is 20 seconds at an elapse of 10 seconds.

When the conversion process is not necessary, the procedure returns to the step of waiting for a timer call (waiting for being called by the timer due to occurrence of a timeout) (in step S301).

On the other hand, when the conversion process is necessary, content of the update process for the data for which the conversion is to be performed is read from the intermediate structure for update (in step S304). Then, the data structure conversion unit 113 performs the process of reflecting the update information on the classified-by-structure data storage unit 12X (X=1, 2, or 3) of the conversion destination (in step S305).

<Second Exemplary Embodiment>

A second exemplary embodiment of the present invention will be described. In the second exemplary embodiment of the present invention, data is partitioned into a plurality of data pieces for each predetermined unit, and the plurality of data pieces can be stored in a plurality of data nodes. A basic configuration of a system in this exemplary embodiment is set to the one shown in FIGS. 1, 2, 4 and the like. However, as described with reference to FIGS. 15 and 16, contents of data structure management information 921 and data arrangement specifying information 922 are extended in this exemplary embodiment. Further, as described with reference to FIG. 17, this exemplary embodiment is different from the first exemplary embodiment in that, when access accept unit of each data node issues an access request to access process unit, the access accept unit issues the access request to access process unit of a different data node as well, and that data structure conversion unit issues a conversion request to data structure conversion unit of the different data node. A configuration of the data node in this exemplary embodiment is also set to be basically the same as that shown in FIG. 4. Details of the configuration of the data node will be described later, with reference to FIG. 17.

In this exemplary embodiment, data (with a table identifier) to be stored can be partitioned (partitioned) for each of a plurality of storing units (replica identifiers), and a resulting storing unit of the data obtained by the partitioning can be stored in each data node.

FIG. 15 is a table showing an example of the data structure management information 921 (see FIG. 4). The data structure management information 921 includes, for each table identifier, a plurality of replica identifiers and the number of partitions associated with each of the replica identifiers.

In the case of the replica identifier with the number of partitions of "1", the replica (replica) is stored in one data node. The operation in that case is the same as that in the first exemplary embodiment.

When the number of partitions is larger than "1", data having the replica identifier with the number of partitions being larger than "1" is partitioned, and is then stored in a plurality of the data nodes. FIG. 16 is a table showing an example of data arrangement specifying information 922 in that case.

When the number of partitions associated with a certain one of the replica identifiers is larger than "1" in the data structure management information 921, a list of arrangement nodes (list of a plurality of the data nodes where data is partitioned and stored) for the replica identifier is recorded in the data arrangement specifying information 922 (see FIG. 4), as shown in FIG. 16.

In the example of the data structure management information 921 in FIG. 15, the number of partitions associated with the replica identifier of 2 for the table identifier of "WORKERS" is "4". In the data arrangement specifying information 922 in FIG. 16, node numbers 2, 3, 5 and 6 are specified as the "arrangement nodes" for the replica identifier of 2 associated with the table identifier of "WORKERS".

Determination of arrangement nodes is made so that a required availability level supposed for the system as a whole is maintained for each table identifier. The determination of arrangement nodes may be performed manually (a hand), or contents of the data structure management information 921 in FIG. 15 and the data arrangement specifying information 922 in FIG. 16 may be automatically generated by a program.

Generally, an availability level is determined by the number of replicas (number of replicas), for example. When the required availability level is three replicas, three replica identifiers are provided, and the arrangement nodes are determined so that the arrangement nodes are overlapped to one another.

In the example in FIG. 16, the respective arrangement nodes associated with the replica identifiers for the table identifier of "WORKERS" are specified so that the respective arrangement nodes are not the same to one another. Naturally, four or more replica identifiers may be provided. Assume that the number of the replica identifiers is four, for example. Then, when the required availability level remains to be "3", one of the arrangement nodes associated with the replica identifiers for the same table identifier can be duplicately selected (e.g., there may be two of the four replica identifiers for which the arrangement nodes are the same).

When performing partitioning, whether or not to permit duplicate arrangement of the arrangement nodes differs according to the data storage structure for each replica identifier and a partitioning arrangement strategy (partitioning strategy).

In the following case, for example, the arrangement nodes can be subjected to duplicate arrangement for storage, when performing partitioning. Assume that two replicas that have been partitioned into 12 data pieces are stored in the data nodes with node numbers 1 to 18, using a row-store format (data structure B). When duplicate arrangement of the data nodes that are the same to each other is not permitted, the storage is impossible. However, when the following arrangement is made in this case, the arrangement nodes can be subjected to duplicate arrangement while satisfying the level of availability of replicas of 2:

Data with the replica identifier of 0 is partitioned and stored in the nodes with the node numbers of 1 to 12; and Data with the replica identifier of 1 is partitioned and stored in the nodes with the node numbers of 7 to 18.

In this case, when the partitioning strategy is determined such that the data with the replica identifiers of 0 and 1 of the same record are not stored in a same one of the nodes, the availability level can be satisfied. Specifically, when table partitioning is performed, the following storage arrangement is made to distribute and allocate the data according to the value of any column (to partition the data between the first half value and the latter half value of the column):

the data with the replica identifier of 0 corresponding to the first half of the value of the column are stored in the nodes with the node numbers of 1 to 6, and the data with the replica identifier of 1 corresponding to the latter half of the value of the column are stored in the nodes with the node numbers of 7 to 12; and the data with the replica identifier of 1 corresponding to the first half of the value of the column are stored in the nodes with the node numbers of 7 to 12, and the data with the replica identifier of 1 corresponding to the latter half of the value of the column are stored in the nodes with the node numbers of 13 to 18. By doing so, storage of the same record in the same node can be avoided. With such an arrangement, availability can be satisfied while duplicate arrangement of the arrangement nodes is performed.

Determination of the node of an arrangement destination is made so that the availability level specified for the system or each table identifier is satisfied.

When updating data with the replica identifier whose number of partitions is larger than "1", any one of a group of arrangement nodes may be selected as the access destination of the data. Alternatively, a first one of the nodes that have been listed in the list of arrangement nodes may be selected (e.g., the data node with the node number of 2 in the case of the data having the table identifier of "WORKERS" and the replica identifier of "2"). The process of conversion by data structure conversion unit 113 from the classified-by-structure data storage unit 121 to a classified-by-structure data storage unit 122 or 123 is a little more simplified by employing the latter selection method.

When performing the partitioning, distribution and arrangement of data may be performed using a consistent hashing scheme or the like. Alternatively, storage destinations of the data may be determined based on the value of a certain column in the table as described above, or a unique Key range.

When a plurality of partitioning arrangement strategies are provided, information on the partitioning arrangement strategy selected for each replica identifier needs to be recorded in the data arrangement and identification information 922 (see FIG. 4).

This exemplary embodiment is different from the first exemplary embodiment in that, when the partitioning is performed, a conversion process by the data structure conversion unit 113 (see FIG. 17) is different from the conversion process (in step S305 in FIG. 14), and an update process on a data structure having the update trigger of "0" are different from the update process (in step S205 in FIG. 13), and the data storage unit of the node of a specified arrangement destination is updated.

Assume that an access process on the data node is performed. Then, when the destination of the access extends across a plurality of the nodes due to the partitioning, access accept unit 111 (see FIG. 17) needs to issue an access request to access process unit 112 (see FIG. 17) of the data node of the arrangement destination different from the data node of the source of the access request.

When the update process is performed on a record having the update trigger (see FIG. 5A) of "0", the access request need to be issued to each of the access process unit 112 of the data nodes in which the record to be subject to the update process is to be stored.

In the case of a reference process as well, the request is issued to each of the access process unit 112 of the data nodes in which a record to be processed is to be stored. Selection of the data nodes that are necessary depends on the distributed arrangement strategy.

Figure 17:
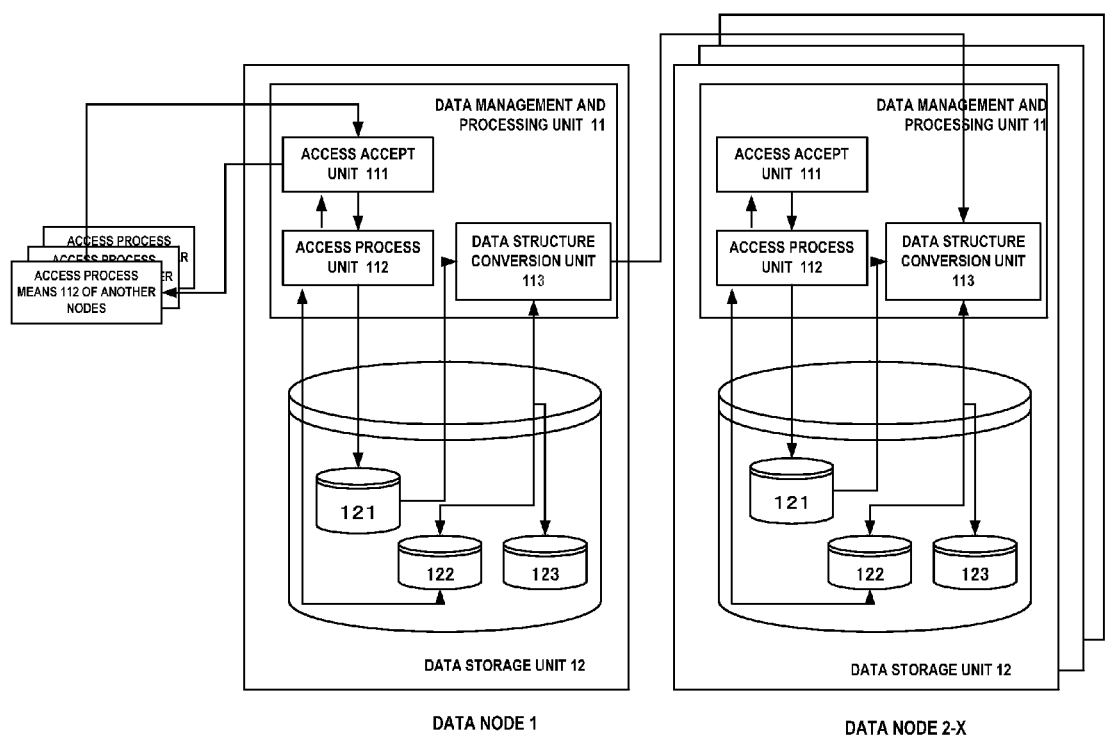
FIG. 17 is a diagram illustrating a configuration example of a data node in the second exemplary embodiment of the present invention.

FIG. 17 is a diagram illustrating a configuration of the second exemplary embodiment of the present invention, and shows a configuration of each of data nodes 1 to X. Different from the access accept unit 111 in the first exemplary embodiment, the access accept unit 111 of each data node in this exemplary embodiment may issue an access request to the access process unit 112 of a different one of the nodes as well when the access accept unit 111 issues an access request to the access process unit 112 of its own node. Similarly, when the data structure conversion unit 113 of each data node periodically determines whether or not it is necessary to perform the conversion process, and then performs the conversion of the structure of data, the data structure conversion unit 113 issues a data conversion request to the data structure conversion unit 113 of a different one of the data nodes that stores data obtained by partitioning of the data. According to the second exemplary embodiment, data can be partitioned and stored in a plurality of the data nodes.

<Third Exemplary Embodiment>

Next, a third exemplary embodiment will be described. In this exemplary embodiment, data structure management information 921 is changed according to the access load. By reflecting a value obtained by the modification on the data structure of the system, the third exemplary embodiment makes it possible to accommodate modification of inappropriateness of setting content of the data structure (data structure assignment for each replica identifier as shown in FIG. 5) and change of an access pattern after the system has been operated. A description will be directed to an operation of autonomously changing a control parameter that achieves these effects.

Figure 18:
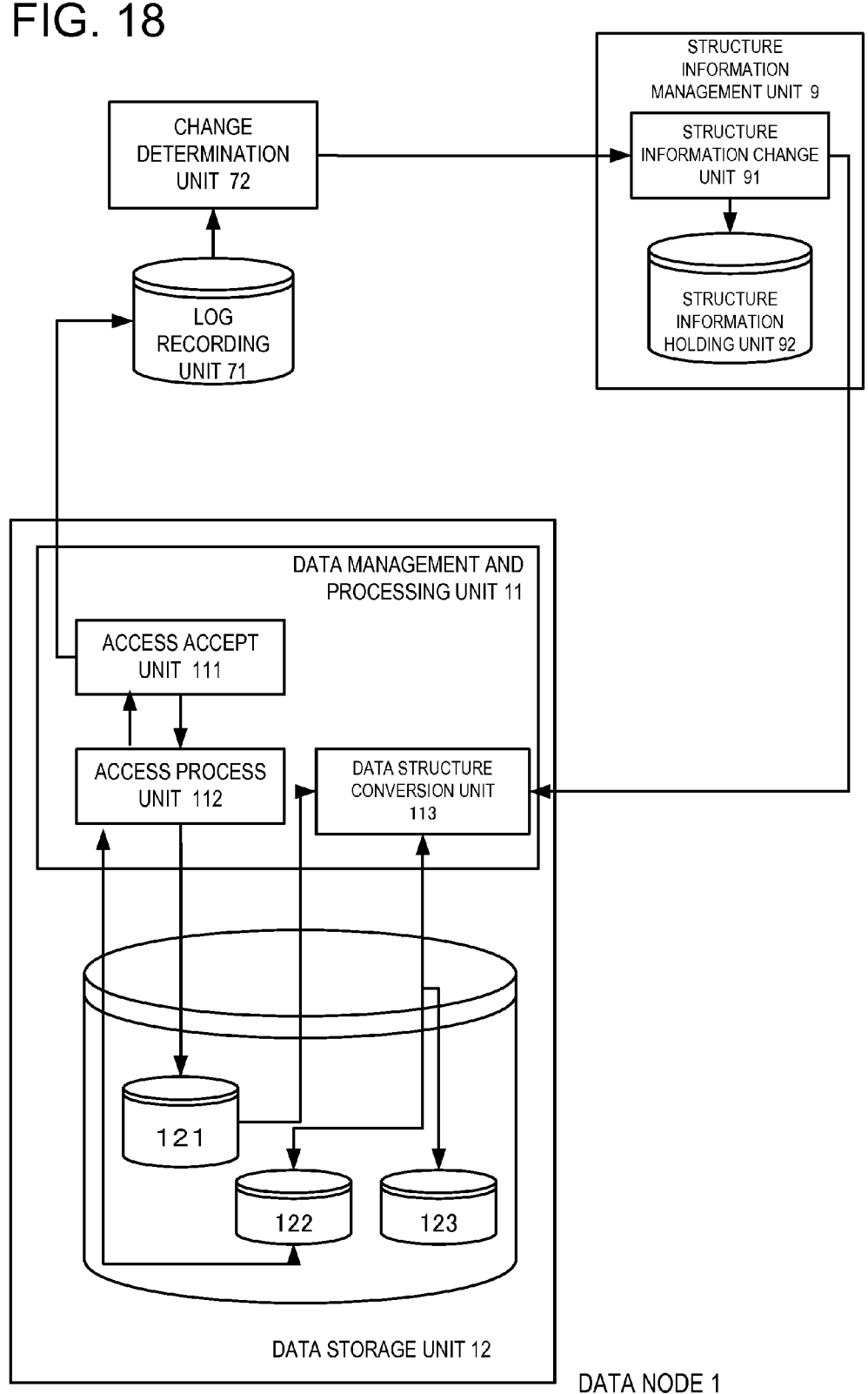
FIG. 18 is a diagram illustrating a configuration example of a data node in a third exemplary embodiment of the present invention.

FIG. 18 is a diagram illustrating a configuration of a data node in the third exemplary embodiment of the present invention. As compared with the first exemplary embodiment described with reference to FIGS. 1, 2, and 4, a log recording unit 71 and change determination unit 72 are added in this exemplary embodiment. Access accept unit 111 (or other arbitrary unit) of each data node in this exemplary embodiment operates to record a received access request in the log recording unit 71. The log recording unit 71 records the access request (or content of an access process) for each replica identifier associated with each table identifier.

It may also be so arranged that one log recording unit 71 is provided for the system as a whole. Alternatively, the log recording unit 71 may be provided for each data node, the access request for each replica identifier associated with each table identifier may be individually recorded in each data node, and then a mechanism for aggregating an access log individually collected by each data node, using a arbitrary method may be provided.

The change determination unit 72 determines whether or not to change each data structure using log information stored in the log recording unit 71. It may be so configured that one change determination unit 72 is provided for the system as a whole. Alternatively, it may be so configured that the change determination unit 72 is distributed and operated in each data node, and a determination about the change is made.

When a structure change is necessary, the change determination unit 72 issues to structure information change unit 91*a* conversion process request for the data structure.

In response to the conversion process request from the change determination unit 72, the structure information change unit 91 alters information in a structure information retention unit 92, and requests the conversion process to data structure conversion unit 113 in data management and processing unit 11 of the data node targeted for the conversion process.

Flows of operations of autonomously changing the control parameter and autonomously changing the data structure in the third exemplary embodiment of the present invention will be described, using FIGS. 19, 20, and 21.

<Control Operation>

Figure 19:
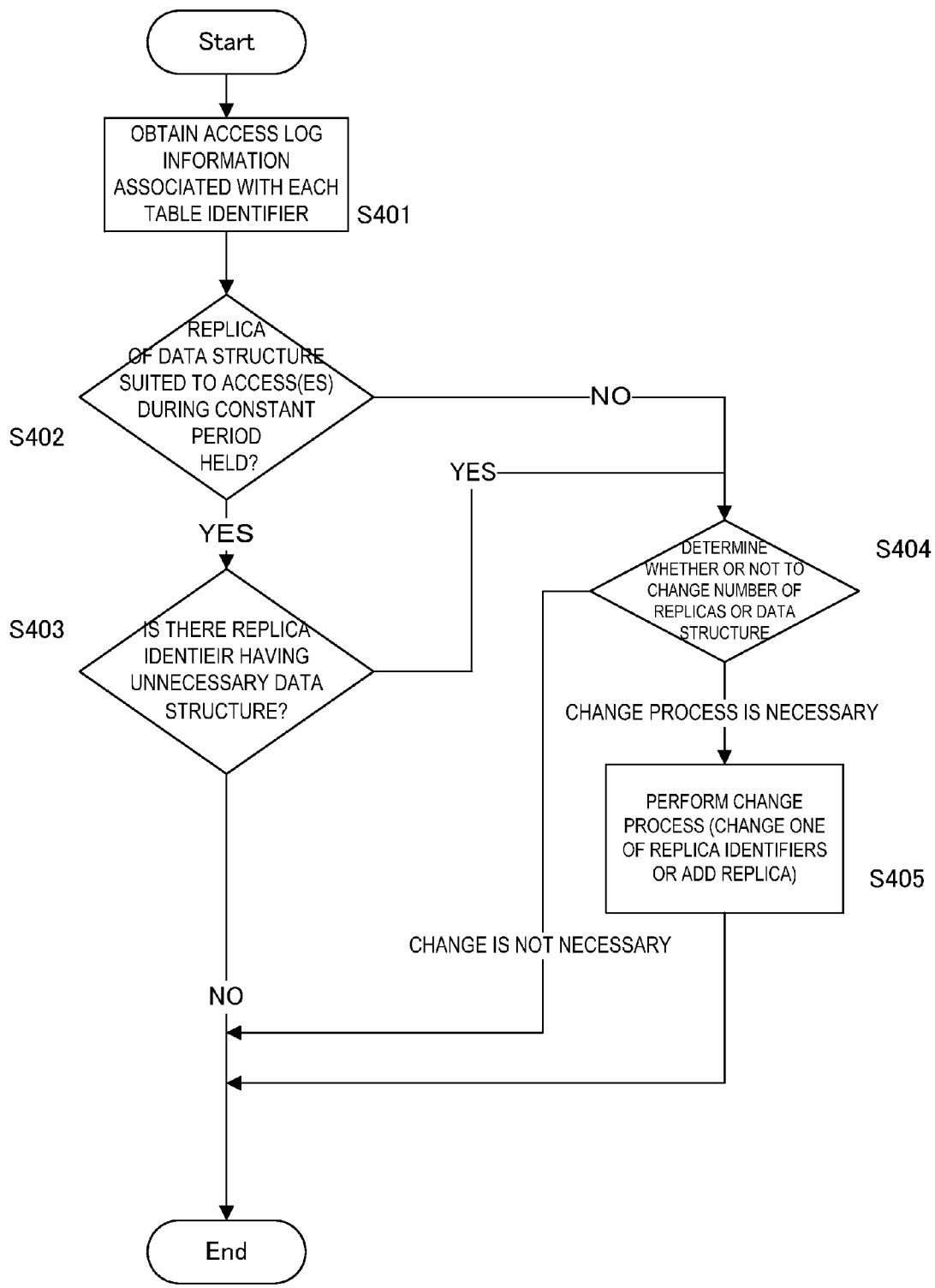
FIG. 19 is a flowchart explaining an overall control flow in the third exemplary embodiment of the present invention.

FIG. 19 is a flowchart explaining a control operation in this exemplary embodiment shown in FIG. 18. By periodically executing the operation described in FIG. 19, the data structure of the system can be autonomously changed and reflected. The cycle of execution may be arbitrarily set. When the cycle is set to be long, it is necessary for the cycle to be compatible with a change process being executed. The change process may also be performed in response to detection of a predetermined event as well as periodic execution of the control operation. Detection of a load change (e.g., a large change in the utilization rate of a part of hardware such as a CPU, a disk, or the like in the data node) by an arbitrary one of components of the system, or the like, for example, may be pointed out as the event.

The operation flow in FIG. 19 shows determination as to whether or not it is necessary to perform a structure conversion process for each table identifier and the conversion process. It is necessary to perform the flow in FIG. 19 for all table identifiers held and managed by the system.

The conversion determination unit 72 obtains access log information in the log recording unit 71 (in step S401).

Next, using the obtained access log information, the conversion determination unit 72 determines whether or not each access content received within a recent certain period (e.g., within the last one day, within the last one week, or the like) has a data structure suited as a replica associated with a corresponding one of the table identifiers (in step S402).

When each access content accepted in step S402 has the data structure suited to one of replica identifiers, the procedure proceeds to step S403. Having the data structure suited to one of replica identifiers means that, when a request for an access that requires a column (column) access is received, content of the access has a column-store structure as the data structure associated with a given one of replica identifiers.

The conversion determination unit 72 determines whether or not each replica identifier has an unnecessary data structure. When a lot of the column-store structures are held even if there is no log about the request for the access that requires the column (column) access, for example, each of the column-store structures may be determined as the unnecessary data structure.

When there is no unnecessary data structure, there is no particular need for performing the conversion process. Thus, the conversion determination unit 72 finishes the flow. On the other hand, when there is an unnecessary data structure, the procedure proceeds to step S404.

In step S404, the conversion determination unit 72 determines whether or not to change the data structure, based on the data structure associated with each replica identifier and the amount and contents of access requests. Determination as to whether or not to change the data structure is made, based on a predefined rule or the like, for example.

Each of the following rules may be pointed out as the rule. Though no particular limitation is imposed, the rule has an if-then structure that is comprised of if <condition> and then <action> (to execute the action if the condition is established).

(R1) If the number of access requests for column accesses is a certain number or less and if the number of total access requests for row accesses is a certain number or more, then, the column-store structure is converted to a row-store structure (or vice versa).

(R2) If the total number of access requests for each table identifier is a certain number of more, then, the number of replicas associated with the table identifier is increased.

(R3) If the number of search queries using the value of a certain column is a certain number or more for each table identifier, then, an index is given to one of replica identifiers. If no access using the value of the certain column is made to the contrary, then, the index is deleted.

(R4) If the number of read process requests is a certain number of more for each table identifier, then, the number of partitionings number is increased (or vice versa).

(R5) If the number of update process requests extending across a plurality of records is a certain number or more for each table identifier, the number of partitionings is reduced. Alternatively, the number of partitionings is set to "1".

The rule is not limited to the above-mentioned rules. Any other rule may be operated.

When it is determined in step S404 that the data structure or the number of replicas needs to be changed, the procedure proceeds to step S405. When it is determined that the data structure or the number of replicas does not need to be changed, the conversion determination unit 72 finishes the flow.

In step S405, the conversion determination unit 72, the structure information change unit 91, data structure conversion unit 113, and the like actually convert the data structure. When a replica is added, one record associated with the table identifier for which the replica is to be added, is added to the data structure management information 921 in the structure information management unit 9. A unique replica identifier is given to the replica, and the arrangement node to arrange the replica is determined. Determination of the arrangement node is made in a similar manner to that in the first exemplary embodiment. The arrangement node may be the same as a different arrangement node if the number of replicas equal to or more than an availability level is maintained.

Using a replica that is the same as the replica with the new replica identifier, the replica of the data is replicated to the arrangement node.

An operation of converting the data structure in step S405 will be described in detail with reference to FIGS. 20 and 21. Referring to FIGS. 20 and 21, partitioning is not performed for the replica identifier, for the sake of simplicity. The conversion process by the data structure conversion unit 113 in FIG. 18 will be described in connection with an example where the data structure is converted to a data structure C from a data structure B.

<Operations of Data Structure Conversion>

Figure 20:
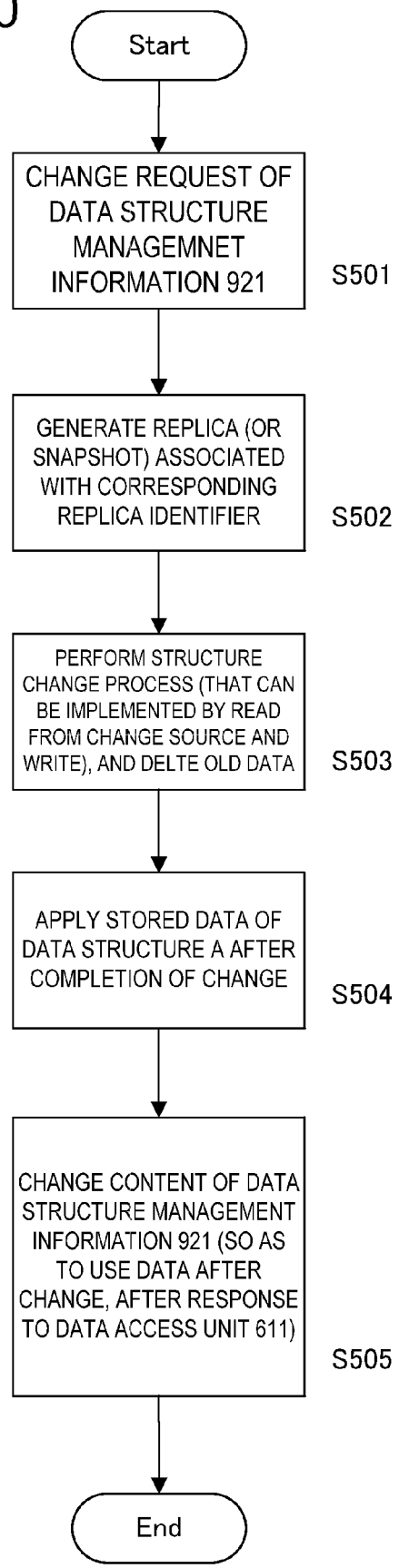
FIG. 20 is a flowchart explaining a data structure conversion process in the third exemplary embodiment of the present invention.

FIG. 20 is a flowchart explaining operations of data structure conversion in this exemplary embodiment.

First, the change determination unit 72 (in FIG. 18) issues a change request for the data structure management information in the structure information retention unit 92 (in FIG. 18) (in step S501 or step S405 in FIG. 19). With this arrangement, the structure information change unit 91 makes a conversion process request to the data structure conversion unit 113 of a data node X of a change destination.

In step S502, the data node X that holds data with the replica identifier to be changed generates a local replica (local replica) associated with the replica identifier. Storage snapshot technology rather than physical copying may be employed for generating this local replica. Alternatively, it may be so arranged that the replica is not generated, and the data of the replica identifier of a different node may be used as the data of conversion source. This replication process is not necessarily needed depending on the implementation method of the conversion process.

Further, in step S503, the data structure conversion unit 113 performs, as the structure conversion process, a process of reading the data of conversion source from the data storage unit and writing the data in the form of a different data structure, as data of conversion destination.

After completion of the structure change by the data structure conversion unit 113, update data stored in the form of a data structure A in the data storage unit for the data structure A during the conversion process (or at a start of the conversion process) is applied to the data structure targeted for conversion (in step S504).

Finally, the content of the data structure management information 921 (see FIG. 4) is altered so that the data of conversion destination is used after an response to an access request from the data access unit 611 (see FIG. 1) of a client node 6 has been made (in step S505).

After the data structure management information 921 (in FIG. 4) has been altered, the data of conversion source is deleted. Though deletion of the data of conversion source is not necessarily needed, memory utilization efficiency is improved by the deletion of the data of conversion source.

<Process in Data Node During Data Structure Conversion Process>

Figure 21:
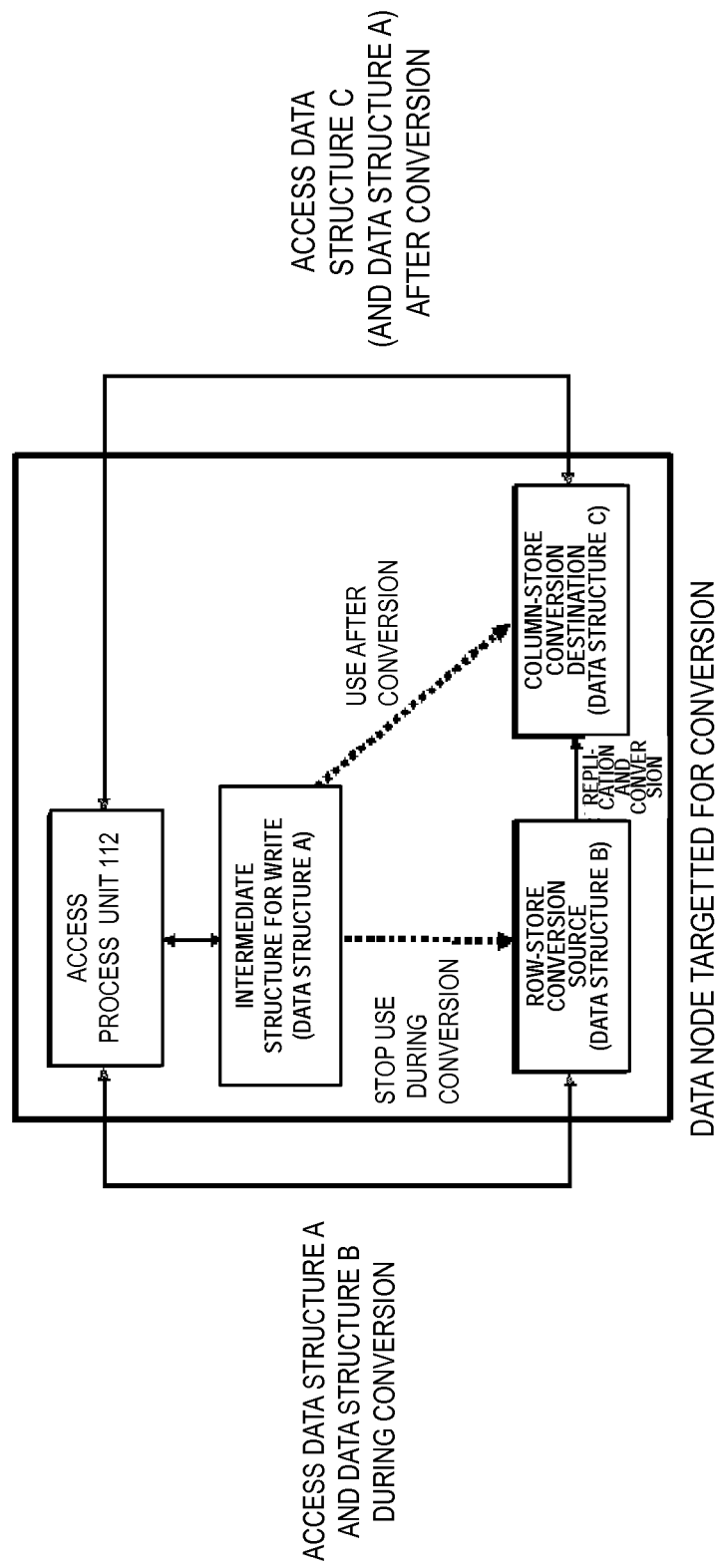
FIG. 21 is a diagram explaining the conversion process in the third exemplary embodiment of the present invention.

FIG. 21 is a diagram explaining processes in the data node during the conversion process in this exemplary embodiment shown in FIG. 18. During the conversion process (in steps S502 to S504) by the data structure conversion unit 113 in FIG. 18, the access process unit 112 responds to the access request using the data structure A and the data structure B. In this case, the update process is held in the form of the data structure A (in the intermediate structure for Write). During the conversion process by the data structure conversion unit 113, application of the update data to the (Row-Store) data structure B is not performed.

After completion of the data structure conversion process by the data structure conversion unit 113 (in step S505), the access process unit 112 processes the access request using the data structure A in the intermediate structure for Write and the data structure C (Column Store) of the conversion destination.

Assume that, when the data node of the access destination is determined, client function implementation unit 61 (see FIG. 1) is configured not to access the data node being subject to the data structure conversion process and to use the data having a different replica identifier. Then, a part of the exclusive process by the access process unit 112 during the data structure conversion process as shown in FIG. 21 becomes unnecessary, so that the configuration of the system is simplified. Conversely, by being equipped with a control mechanism as shown in FIG. 21, even the data with the replica identifier undergoing the data structure conversion process, can be processed.

<Operation of Changing the Number of Partitions>

Figure 22:
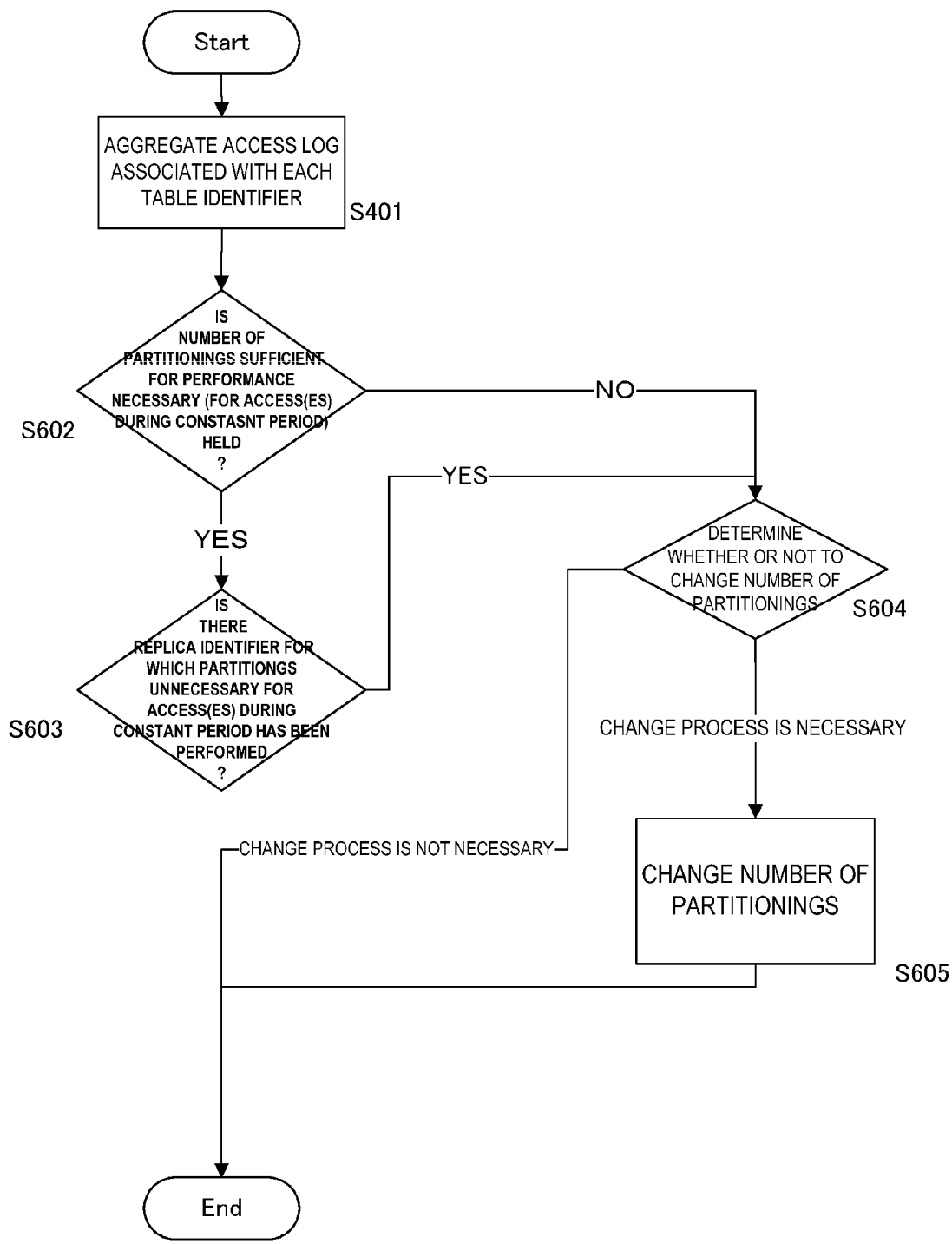
FIG. 22 is a flowchart explaining a process of changing the number of partitionings in the third exemplary embodiment of the present invention.
Figure 23:
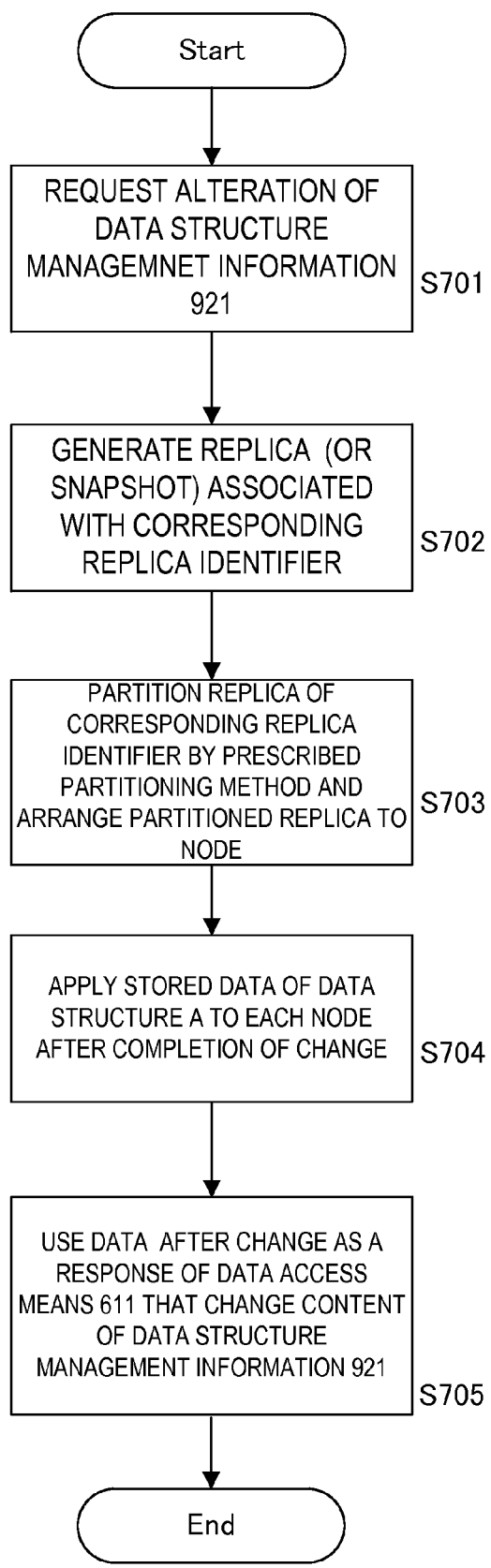
FIG. 23 is a flowchart explaining operations when the number of partitionings is changed in the third exemplary embodiment of the present invention.

Each of FIGS. 22 and 23 is a flowchart explaining operations of changing the number of partitions. The process of changing the number of partitions can be represented as the same flowchart as that in FIG. 19. The following description will be given focusing on a difference between FIG. 22 and FIG. 19. A distribution strategy as well as the number of partitions may be changed. As an example of the change of the distribution strategy, a change from distribution based round-robin to distribution based on an arbitrary column value range, or vice versa can be pointed out.

In step S602 (corresponding to step S402 in FIG. 19), the change determination unit 72 determines whether or not a number of distribution sufficient for required performance is held with respect to the number of access request processes (with respect to parallel processing of data such as processing of scanning all the data, partitioning of the data often provides more advantageous performance). When the number of distribution is necessary and sufficient, the procedure proceeds to step S603. When the number of distribution is not necessary and sufficient, the procedure proceeds to step S604.

The change determination unit 72 determines whether or not unnecessary partitioning has been performed for each replica identifier. The replica identifier with an excessive number of partitions and arrangements though the number of access process requests for parallel data processing is small, for example, corresponds to this case.

When it is determined that there is the replica identifier for which the unnecessary partitioning has been performed, the procedure proceeds to step S604. When it is determined there is no replica identifier for which the unnecessary partitioning has been performed, the flow is finished.

The change determination unit 72 determines whether or not it is necessary to change the number of partitions, in step S604. As described above, the change content of the number of partitions is determined, based on a rule that is arbitrarily specified. In case it is determined that the change is unnecessary, the change determination unit 72 finishes the flow. In case it is determined that the change is necessary, the change determination unit 72 changes the number of partitions (in step S605). Step S605 is a process of actually changing the number of partitions.

<Process of Changing the Number of Partitions>

FIG. 23 illustrates a flow of step S605 (process of changing the number of partitionings by the change determination unit 72) in FIG. 22. The following description will be given focusing a difference between FIG. 23 and FIG. 20.

A local replica described in step S702 is provided in order to use for a response to an access request issued during the conversion process as shown in FIG. 21.

Step S703 is a process of copying, to the data node of the destination of the change, data of a record, for which the arrangement node is to be changed due to the change in the number of partitions.

Step S704 is substantially equivalent to step S504 in FIG. 20. However, step S704 is different from step S504 in that the destination of applying update process content stored in the data structure A during the data structure change may be the data node different from the data node of the destination of the change.

Step S705 is substantially equivalent to step S505 in FIG. 20.

By changing a node to which partitioned data is arranged, writing a portion of the data to a disk, or storing the partitioned data in an archive storage separately provided, the space efficiency and the storage cost of the system can be reduced.

Figure 24:
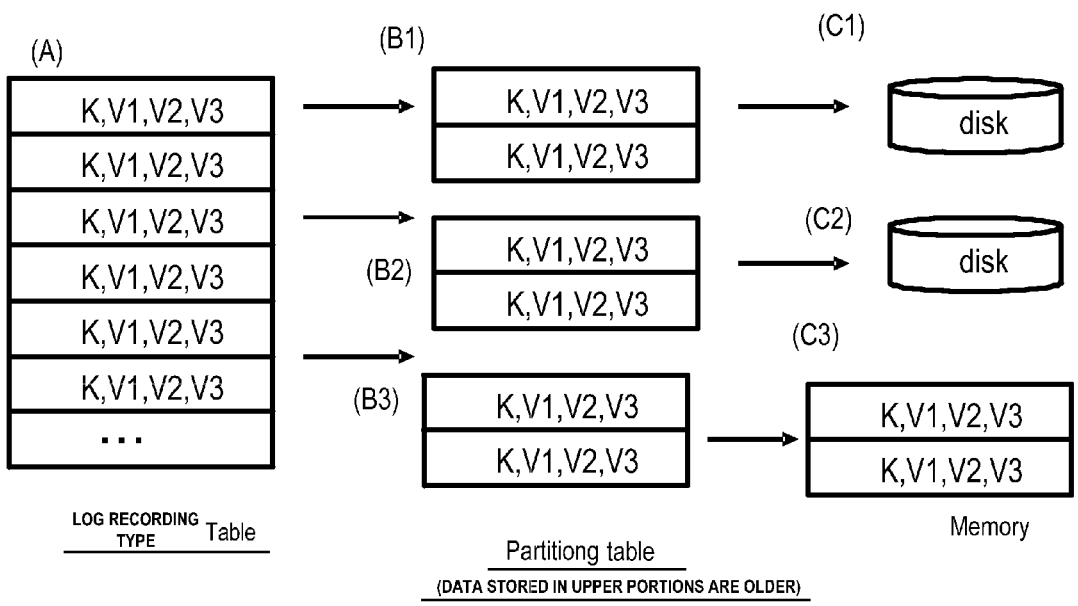
FIG. 24 is a diagram explaining data arrangement of a distributed table in the third exemplary embodiment of the present invention.

To take an example, a distributed arrangement strategy may be determined in time series manner for a log recording type table (A) such an order log in which a record is stored additionally. Then, as shown in FIG. 24, old data (B1, B2) may be written to disks (C1, C2), or may be written to a different archive, and only new data (B3: most recent partitioning table) may be held in a memory (C3).

Data arrange identification information 922 in the structure information retention unit 92 in this exemplary embodiment is as shown in FIG. 25, for example. In the data arrangement specifying information 922, each table identifier includes, in association with each replica identifier, respective information of an arrangement node, a distributed arrangement strategy, and an arrangement physical medium. The log recording table (A) in FIG. 24 is stored according to the order of the table identifiers.

As the distributed arrangement strategy, information on an arrangement strategy (round-robin distribution, distribution of column 1 value, or time series, or the like) is specified.

In the data arrangement specifying information 922, a replica with the replica identifier of 2 associated with the table identifier of "orders" is distributed and arranged in the arrangement nodes 2-10 in time series, and a physical media (memory, disks, and the like) of arrangement destinations are specified.

<Fourth Exemplary Embodiment>

An example of application to consistent hashing will be described, as a fourth exemplary embodiment. The following describes, using FIG. 26, an example where a table A is divided and arranged for storage in a column-store format, based on consistent hashing. In this exemplary embodiment, the process of determining a data node on which data is arranged (data arrangement node) based on consistent hashing may be performed by the change determination unit 72 in FIG. 18. Node information is recorded in a structure information retention unit 92 by the change determination unit 72. Though no particular information is imposed, in this exemplary embodiment, with respect to the table where a set of the value of a key (Key) and one or more data records associated with the key value for each column is set as a unit in a row direction, the data node for allocating the data is determined based on consistent hashing. In this table, each row is identified by the key (Key) value, and column identifiers (Value 1, Value 2, . . . ) are given to respective columns. A hash value is determined by a hash function using a character string that combines the key value, a column identifier, and a table identifier, as an argument. Then, a data node of data arrangement destination is determined based on the hash value and information of a list of storage destination nodes.

In case the table A is divided and arranged for storage in a row-store format based on consistent hashing, a data arrangement node may be determined by performing hashing using the Key value of a record. The data arrangement node is determined by using the Key value or a unique (unique) record ID.

Figure 26:
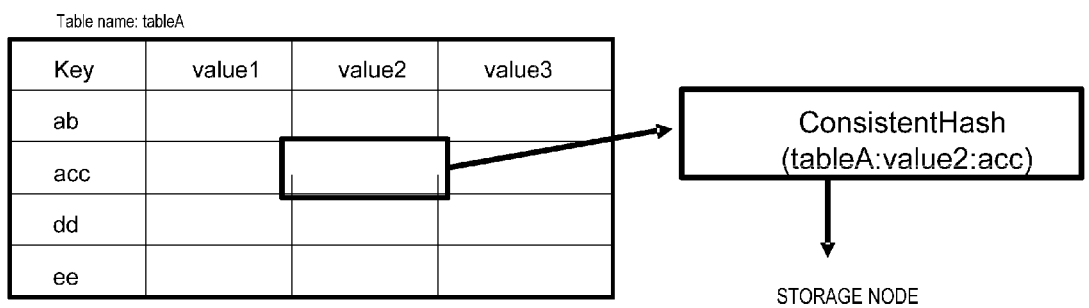
FIG. 26 is a diagram explaining distributed arrangement based on consistent hashing in a fourth exemplary embodiment of the present invention.

As schematically shown in FIG. 26, in the constant hashing method, the character string that combines the table identifier, the name of the column, and the Key value (table identifier: table A+column identifier of value 2+Key value: acc) is given to the hash function, as the argument. Then, the hash value is calculated.

The data node can be determined by the consistent hashing scheme, based on the output (hash value) of the hash function for the argument and the list of storage destination nodes (such as data nodes 1 to 4).

Alternatively, a unique record ID may be given for each record, and a combination of the table identifier, the name of the column, and the record ID may be set to the argument to be given to the hash function.

Figure 27A:
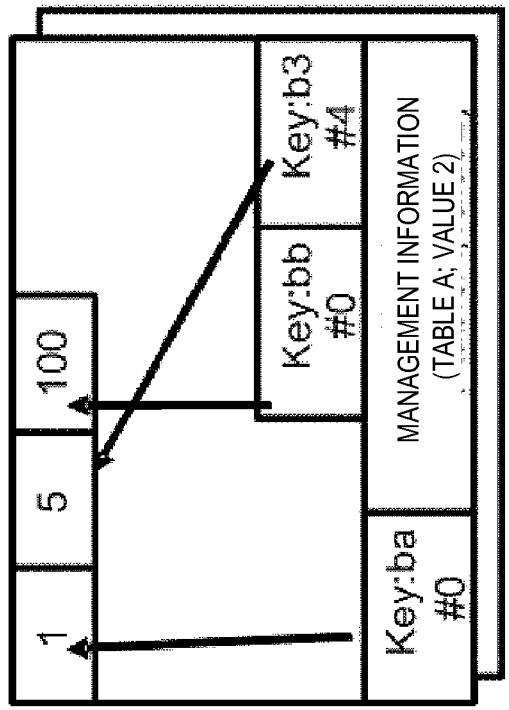
FIGS. 27A and 27B are diagrams each explaining an information storage format in the fourth exemplary embodiment of the present invention.
Figure 27B:
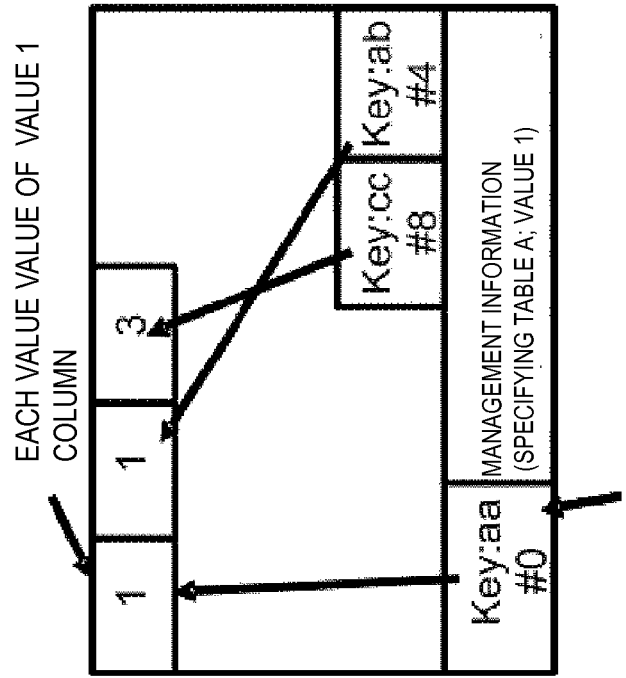

FIGS. 27A and 27B are diagrams for explaining a recording scheme used in a data arrangement node in this exemplary embodiment. Since the column-store format is used, data is recorded for each column. An outer rectangle indicates a unit for managing the recording region of the data arrangement node, and corresponds to a page of a memory or an HDD (hard disk drive), for example. The size of the page may be set to an arbitrary value. Management information for specifying the table identifier (table A) and the name of the column (value 1) is recorded at an arbitrary location within the page (at the bottom of the page in the drawing). When all of one column is not accommodated in one page, it is necessary to record the column in a different unit. Information on a pointer to the different unit may be recorded in this site (recording region). The value of each cell is stored in an arbitrary address of the page. FIG. 27A sequentially records the value of each cell (each value of the column with the column name of value 1) from the beginning of the page.

It is necessary to separately record, at an arbitrary location, information indicating to which Key information of the value of each cell corresponds. In FIG. 27A, this information is recorded immediately before the management information within the same unit. Information on each Key (or unique record ID) and information (pointer) indicating in which address the value of each cell is stored are recorded immediately before the management information. Information of (Key: cc #8) records that the value of the cell associated with a Key: cc is stored in an address #8, information of (Key: ab #4) records that the value of the cell associated with a Key: ab is stored in an address #4, and information of (Key: aa #0) records that the value of the cell associated with a Key: aa is stored in an address #0.

Information on a different column (value 2) in the same table may be recorded in a different recording management unit (memory or HDD), as shown in FIG. 27B. Alternatively, the table A may be distributed and arranged by a further simpler method.

As a first example of partitioning in this exemplary embodiment, assume that the partitioning is performed on a table (column-store). In this table, a set including a key value and one or more data records associated with the key value for each column is made a unit in the row direction, each row is identified by the key value, and column identifiers are given to respective columns. In this case, a hash value may be determined by a hash function using a character string that combines the column identifier and the table identifier, as an argument. Then, a data node of data arrangement destination is arranged may be determined based on the hash value and the information of the list of storage destination nodes. The data may be distributed and arranged to data nodes that are separate for each column. The data may be stored in the separate data nodes in data structures that are different for each unit of partitioning.

Figure 28:
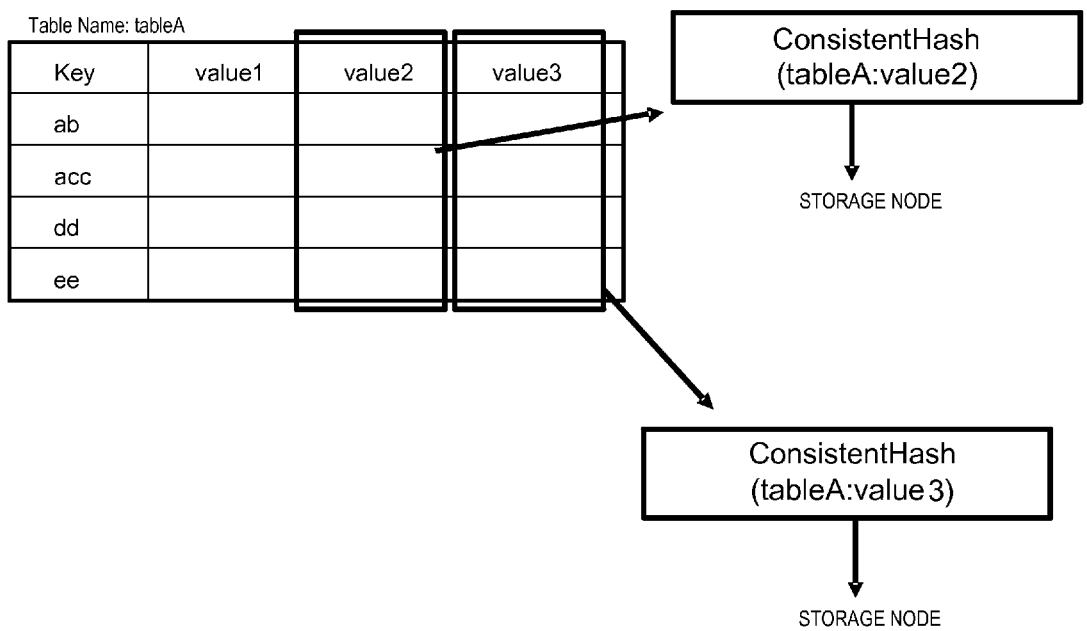
FIG. 28 is a diagram explaining column-based distributed arrangement based on consistent hashing in the fourth exemplary embodiment of the present invention.

FIG. 28 is a diagram schematically showing a case where the table is partitioned for each column of the table, and the data arrangement nodes are distributed and arranged for each column of the table. As a value to be given to the hash function, the table identifier and the name of the column (e.g., (table A: value 2) or (table A: value 3) should be just given. The node for storage is calculated from the output (hash value) of the hash function for the argument.

Alternatively, as a second example of partitioning in this exemplary embodiment, assume that partitioning is performed on one column of the table where a set including a key value and one or more data records associated with the key value for each column is made a unit in a row direction. In this table, each row is identified by the key value, and the column identifiers are given to respective columns. In this case, a hash value may be determined by a hash function using a character string that combines the table identifier, the column identifier, and a unique suffix, as an argument. Then, a data node to which the data is arranged may be determined based on the hash value and the information on the list of storage destination nodes. The one column may be thereby distributed and arranged to a plurality of data nodes. The data may be stored in the plurality of data nodes of arrangement destinations in data structures different for each unit of partitioning.

Figure 29:
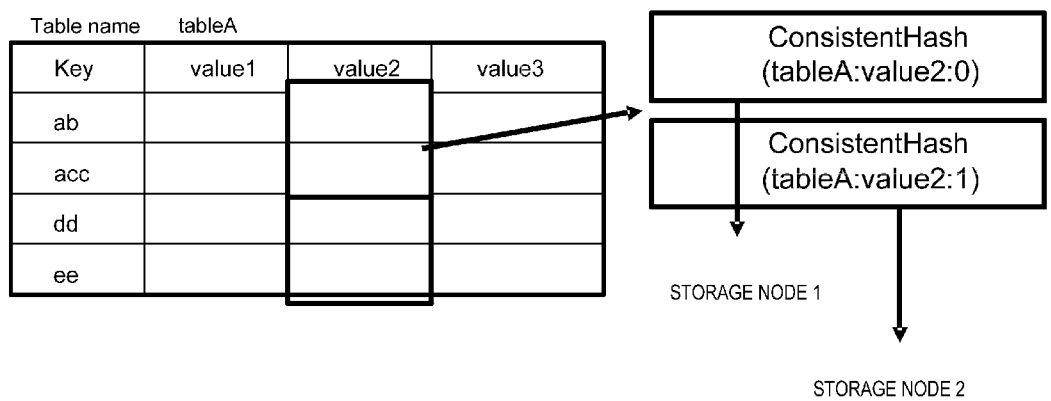
FIG. 29 is a diagram explaining distributed arrangement based on consistent hashing when one column is partitioned in the fourth exemplary embodiment of the present invention.

FIG. 29 is a diagram schematically showing a case where one column of the table is partitioned into two portions. In this case, by giving the unique suffix such as a number, in addition to the table identifier and the name of the column, as the value to be given as the argument of the hash function so as to partition the column, the plurality of data arrangement nodes (storage nodes) are obtained.

Consequently, one of the two portions of the one column of the table associated with the Key values of ab and acc is arranged to a data arrangement node (storage node) 1. The other portion of the one column of the table associated with the Key values of dd and ee is arranged to a data arrangement node (storage node) 2.

Each combination of this Key value and the suffix (or a value from which that the combination can be calculated) is stored in a structure information retention unit 92 in FIG. 18. When the Key value is a number, the suffix may be specified for each numerical value range. To take an example, an identifier for the numerical value range of 1-100 is set to 0 (as a result, data associated with the numerical value range of 1-100 is stored in the storage node 1). With such an arrangement, the capacity of data to be held and managed in the structure information retention unit 92 can be reduced.

In the partitioning of the table in each of the first and second examples in the above-mentioned exemplary embodiment, the partitioning for storage in the column-store format was described. The present invention can also be similarly applied to the row-store format as well. In this case, the key value or the like is used in place of the column identifier.

In the consistent hashing scheme, a plurality of data arrangement nodes participating in the distributed storage system may be divided into groups associated with an operation state of the system, for example. Then, one of the data arrangement nodes that has received a data write request generates one or more data replicas corresponding to the number of data replicas specified for each group in the plurality of data arrangement nodes participating in the distributed storage system. In this case, the number of the one or more data replicas to be generated is determined for each group, and a list of one or more of the data arrangement nodes of replica destinations may be generated by traversing a hash ring having the plurality of data arrangement nodes logically arranged thereon and then searching one or more replica destinations until the number of the one or more data replicas specified for each group is attained. Alternatively, upon receipt of the list of the one or more data arrangement nodes of replica destinations, a replication instruction may be issued to each data arrangement node of the list. The list of the one or more data arrangement nodes of replica destinations may be generated in response to the data write request from a client, and the data may be generated, corresponding to the number of data replicas associated with each group to which each of the plurality of data arrangement nodes arranged on the hash ring belongs.

The information system of an enterprise is implemented by using a distributed storage system or a database system. A system configured to provide a service that is the basis of business content of the enterprise is called an "enterprise system" or a "backbone system". A sales and inventory management system, a POS (Point of sales system) cash register system, or the like is included in the enterprise system or the backbone system. A system for performing data analysis in order to use information in these enterprise systems for decision making of the enterprise (by sometimes aggregating the information) is known as a data warehouse. Generally, data access characteristics of these systems (enterprise system and data warehouse) are different. Thus, it has been a practice to provide the database system and to specialize the data structure of the database system to suit to the access characteristic of each of these systems (so as to perform processing at high speed). The data warehouse system includes a large-scale database for extracting data (such as transaction data) from a plurality of the enterprise systems and then reconfiguring the data for information analysis and decision making, for example. It is necessary to migrate data from the database of the enterprise system to the database of the data warehouse. This process is called ETL (Extract/Transform/Load). It is known that an increase in the amount of data to be handled by both of the enterprise system and the data warehouse system will cause a high load in the ELT. By applying the present invention, a bottleneck that may be caused by data structure conversion can be solved, and storage utilization efficiency can be thereby enhanced.

The data storage system according to the present invention can be applied to a parallel database, a parallel data processing system, a distributed storage, a parallel filing system, a distributed database, a data grid, and a cluster computer.

The entirety or part of the disclosed exemplary embodiments is described below, though not limited thereto.

(Supplementary Note 1)

A distributed storage system, comprising:

a plurality of data nodes coupled via a network, the data nodes including data storage units, respectively, wherein the data nodes of replication destination of data, include at least two data nodes that hold, in the respective data storage units thereof, data structures logically identical but physically different between the data nodes.

(Supplementary Note 2)

The distributed storage system according to Supplementary Note 1, wherein each of the data nodes of replication destinations performs conversion to a target data structure asynchronously with reception of replication data.

(Supplementary Note 3)

The distributed storage system according to Supplementary Note 2, wherein each of the data nodes of replication destinations holds the replication data in an intermediate data retention structure, returns a response, and asynchronously converts a data structure held in the intermediate data retention structure to the target data structure.

(Supplementary Note 4)

The distributed storage system according to Supplementary Note 2, comprising:

a unit that variably controls the data node of a data arrangement destination, the data structure of the arrangement destination, and data partitioning, for each table set in advance.

(Supplementary Note 5)

The distributed storage system according to any one of Supplementary Notes 1 to 4, comprising:

a unit that determines the data node to arrange data by consistent hashing.

(Supplementary Note 6)

The distributed storage system according to any one of Supplementary Notes 1 to 5, wherein when replication is executed at a time of a data update, each data node of a replication destination temporarily holds data to be updated in the intermediate data retention structure, returns a response for the update, converts the data to be updated to the target data structure that has been specified, asynchronously with an update request, and then stores the converted data in the data storage unit.

(Supplementary Note 7)

The distributed storage system according to any one of Supplementary Notes 1 to 6, comprising:

a structure information management apparatus including a structure information retention unit configured to store and manage data structure management information provided corresponding to a number of types of the data structures and data arrangement specifying information, the data structure management information each including, in association with a table identifier that is an identifier configured to identify data to be stored, a replica identifier configured to identify a replica, data structure information configured to identify a type of the data structure associated with the replica identifier, and update trigger information that is information indicating a period to be taken for the replica to be converted to the data structure that has been specified, the data arrangement specifying information including, in association with the table identifier, the replica identifier, data node information indicating the data nodes of one or a plurality of data arrangement destinations associated with the replica identifier;

a client function implementation unit including a data access unit configured to identify an access destination for each of an update process and a reference process by referring to the data structure management information and the data arrangement specifying information; and a plurality of the data nodes each including the data storage unit, the plurality of the data nodes being connected to the structure information management apparatus and the client function implementation unit;

each of the data nodes including:

a data management and processing unit configured to hold data in the intermediate data retention structure and returns the response to the client function implementation unit when the update process is performed based on an access request from the client function implementation unit; and a data structure conversion unit configured to perform a process of converting the data held in the intermediate data structure to the data structure specified in the data structure management information, by referring to the data structure management information, according to an update trigger specified.

(Supplementary Note 8)

The distributed storage system according to Supplementary Note 7, wherein the intermediate data retention structure holds the data until the data is stored in the data storage unit with the target data structure specified.

(Supplementary Note 9)

The distributed storage system according to Supplementary Note 7, wherein the client function implementation unit selects the data node of an access destination according to content of the update process or the reference process, based on the data structure management information and the data arrangement specifying information.

(Supplementary Note 10)

The distributed storage system according to Supplementary Note 7, wherein the client function implementation unit obtains the data arrangement specifying information held in the structure information retention unit of the structure information management apparatus or the data arrangement specifying information held in a structure information cache holding unit configured to cache the information held in the structure information retention unit, and issues an access instruction to the data node of a data arrangement destination.

(Supplementary Note 11)

The distributed storage system according to Supplementary Note 7 or 10, wherein the data node includes an access accept unit, an access process unit, and the data structure conversion unit;

the data storage unit of the data node includes a classified-by-structure data storage unit;

the access accept unit receives the update request from the client function implementation unit, and then transfers the update request to the data node specified in association with the replica identifier in the data arrangement specifying information;

the access process unit of the data node performs a process associated with the received update request, executes the update process by referring to information in the data structure management information, converts the update data to the data structure specified in the data structure management information and updates the classified-by-structure data storage unit when the update trigger for the data node is zero;

the access process unit temporarily writes the update data to the immediate data retention structure and makes a response indicating completion of the process when the update trigger is not zero;

the access accept unit makes the response to the client function implementation unit upon receipt of a notification of the completion from the access process unit and a notification of completion from the data node of the replication destination; and the data structure conversion unit converts the data in the immediate data retention structure to the data structure specified in the data structure management information and stores the converted data in the classified-by-structure data structure unit for the converted data.

(Supplementary Note 12)

The distributed storage system according to Supplementary Note 7, wherein when an access for reference is made, the client function implementation unit selects the data structure suited to the data access for the data node, identifies the replica identifier, and computes the data node to be accessed, issues an access request to the selected data node, and then receives a result of the access process from the data node.

(Supplementary Note 13)

The distributed storage system according to Supplementary Note 7, wherein the client function implementation unit is provided within the data node.

(Supplementary Note 14)

The distributed storage system according to Supplementary Note 13, wherein the client function implementation unit comprises a structure information cache holding unit configured to cache the information in the structure information retention unit.

(Supplementary Note 15)

The distributed storage system according to Supplementary Note 14, comprising:

a structure information synchronization unit configured to synchronize the structure information in the structure information cache holding unit of the client function implementation unit and the structure information held in the structure information retention unit of the structure information management apparatus.

(Supplementary Note 16)

The distributed storage system according to Supplementary Note 7, wherein the data structure management information includes, in association with the replica identifier a number of partitions indicating a number of partitionings of data for storage in a plurality of the data nodes;

the data arrangement specifying information includes the plurality of the data nodes as the nodes for arrangement corresponding to the replica identifier associated the number of partitions of two or more in the data structure management information; and when arrangement destinations of the partitioned data extend across a plurality of the data nodes, the access accept unit of the data node that has received the access request issues an access request to the access process unit of each of the plurality of data nodes different from the data node that has received the access request.

(Supplementary Note 17)

The distributed storage system according to Supplementary Note 7 or 11, wherein
when the update trigger is zero, the data structure conversion unit of the data node that has received the access request issues an access request to the data structure conversion unit of the data node different from the data node that has received the access request.

(Supplementary Note 18)

The distributed storage system according to Supplementary Note 7, comprising:
a log recording unit configured to record a log of the access request; and
a change determination unit configured to determine whether or not to convert the data structure, using information on the log recorded in the log recording unit.

(Supplementary Note 19)

The distributed storage system according to Supplementary Note 18, wherein
the change determination unit outputs a conversion request to the structure information changing unit of the structure information management apparatus when the change determination unit determines that data structure conversion is necessary;
the structure information changing unit of the structure information management apparatus alters the information in the structure information retention unit, and outputs a conversion request to the data structure conversion unit of the data node; and
the data structure conversion unit of the data node converts the data structure held in the data storage unit of the data node.

(Supplementary Note 20)

A distributed storage method in a system comprising a plurality of data nodes coupled via a network, the plurality of data nodes respectively including data storage units, the method comprising:
at least two of the data nodes of data replication destinations, in respective data storage units thereof, holding data structures that are logically identical but are physically different between the at least two of the data nodes.

(Supplementary Note 21)

The distributed storage method according to Supplementary Note 20, comprising:
by each of the data nodes of replication destinations, performing conversion to a target data structure asynchronously with reception of replication data.

(Supplementary Note 22)

The distributed storage method according to Supplementary Note 21, comprising:
by each of the data nodes of replication destinations, holding the replication data in an intermediate data retention structure, returning a response, and asynchronously converting a data structure held in the intermediate data retention structure to the target data structure.

(Supplementary Note 23)

The distributed storage method according to Supplementary Note 21, comprising:
variably controlling the data node of a data arrangement destination, the data structure of the arrangement destination, and data partitioning, for each table set in advance.

(Supplementary Note 24)

The distributed storage system according to any one of Supplementary Notes 20 to 23, comprising:
determining the data node to arrange data by consistent hashing.

(Supplementary Note 25)

The distributed storage method according to any one of Supplementary Notes 20 to 24, comprising:
by each data node of a replication destination, temporarily holding data to be updated in the intermediate data retention structure, returning a response for the update, converting the data to be updated to the target data structure that has been specified, asynchronously with an update request, and then storing the converted data in the data storage unit when replication is executed at a time of a data update.

(Supplementary Note 26)

The distributed storage method according to Supplementary Note 25, comprising:
by a structure information management unit, storing and managing data structure information including data structure management information and data arrangement specifying information, the data structure management information being provided corresponding to a number of types of the data structures and each including, in association with a table identifier that is an identifier configured to identify data to be stored, a replica identifier configured to identify a replica, data structure information configured to identify a type of the data structure associated with the replica identifier, and update trigger information that is information indicating a period to be taken for the replica to be converted to the data structure that has been specified, the data arrangement specifying information including, in association with the table identifier, the replica identifier, data node information indicating the data nodes of one or a plurality of data arrangement destinations associated with the replica identifier;
by a client, identifying an access destination for each of an update process and a reference process by referring to the data structure management information and the data arrangement specifying information; and
by each of the data nodes,
holding data in the intermediate data retention structure and returning the response to the client when the update process is performed based on an access request from the client; and
converting the data held in the intermediate data structure to the data structure specified in the data structure management information, by referring to the data structure management information, in response to an update trigger specified.

(Supplementary Note 27)

The distributed storage method according to Supplementary Note 26, wherein
the data structure management information includes, in association with the replica identifier a number of partitions indicating a number of partitionings of data for storage in a plurality of the data nodes;
the data arrangement specifying information includes the plurality of the data nodes as the nodes for arrangement corresponding to the replica identifier associated the number of partitions of two or more in the data structure management information; and
the method comprises:
by the data node that has received the access request, issuing an access request to the access process unit of each of the plurality of data nodes different from the data node that has received the access request, when arrangement destinations of the partitioned data extend across a plurality of the data nodes.

(Supplementary Note 28)

The distributed storage method according to Supplementary Note 26, comprising:
determining whether or not to convert the data structure, using information on a log recorded in a log recording unit configured to record the log of the access request, and converting the structure information and further converting the data structure of the data node when the conversion is needed.

(Supplementary Note 29)

The distributed storage system according to Supplementary Note 5, wherein, with respect to a table where a set of a key value and one or a plurality of data records associated with the key value for each of one or a plurality of columns is set as a unit in a row direction and a column identifier is given to each column, a hash value is determined by a hash function using a character string that combines the key value, the column identifier, and an identifier for the table as an argument, and then the data node for allocating the data is determined by consistent hashing, based on the hash value and information of a list of the nodes of storage destinations.

(Supplementary Note 30)

The distributed storage system according to Supplementary Note 5, wherein, with respect to a table where a set of a key value and one or a plurality of data records associated with the key value for each of one or a plurality of columns is set as a unit in a row direction and a column identifier is given to each column, a hash value is determined by a hash function using a character string that combines the column identifier and an identifier for the table as an argument, and then the data node for allocating the data is determined by consistent hashing, based on the hash value and information of a list of the nodes of storage destinations, thereby distributing and allocating each column to the separate data nodes.

(Supplementary Note 31)

The distributed storage system according to Supplementary Note 5, wherein, with respect to a table where a set of a key value and one or a plurality of data records associated with the key value for each of one or a plurality of columns is set as a unit in a row direction and a column identifier is given to each column, a hash value is determined by a hash function using a character string that combines the column identifier, an identifier for the table, and a unique suffix as an argument, and then the data node for allocating the data is determined by consistent hashing, based on the hash value and information of a list of the nodes of storage destinations, thereby distributing and allocating one column to a plurality of the data nodes.

(Supplementary Note 32)

The distributed storage system according to Supplementary Note 5, wherein, with respect to a table where a set of one or a plurality of data records for each of one or a plurality of columns is set as a unit in a row direction, a column identifier is given to each column, and a unique record identifier is given to each record, a hash value is determined by a hash function using a character string that combines an identifier for the table, the column identifier, and the record identifier as an argument, and then the data node for allocating the data is determined by consistent hashing, based on the hash value and information of a list of the nodes of storage destinations.

(Supplementary Note 33)

The distributed storage method according to Supplementary Note 24, wherein, with respect to a table where a set of a key value and one or a plurality of data records associated with the key value for each of one or a plurality of columns is set as a unit in a row direction and a column identifier is given to each column, a hash value is determined by a hash function using a character string that combines the key value, the column identifier, and an identifier for the table as an argument, and then the data node for allocating the data is determined by consistent hashing, based on the hash value and information of a list of the nodes of storage destinations.

(Supplementary Note 34)

The distributed storage method according to Supplementary Note 24, wherein, with respect to a table where a set of a key value and one or a plurality of data records associated with the key value for each of one or a plurality of columns is set as a unit in a row direction and a column identifier is given to each column, a hash value is determined by a hash function using a character string that combines the column identifier and an identifier for the table as an argument, and then the data node for allocating the data is determined by consistent hashing, based on the hash value and information of a list of the nodes of storage destinations, thereby distributing and allocating each column to the separate data nodes.

(Supplementary Note 35)

The distributed storage method according to Supplementary Note 24, wherein, with respect to a table where a set of a key value and one or a plurality of data records associated with the key value for each of one or a plurality of columns is set as a unit in a row direction and a column identifier is given to each column, a hash value is determined by a hash function using a character string that combines the column identifier, an identifier for the table, and a unique suffix as an argument, and then the data node for allocating the data is determined by consistent hashing, based on the hash value and information of a list of the nodes of storage destinations, thereby distributing and allocating one column to a plurality of the data nodes.

(Supplementary Note 36)

The distributed storage method according to Supplementary Note 24, wherein, with respect to a table where a set of one or a plurality of data records for each of one or a plurality of columns is set as a unit in a row direction, a column identifier is given to each column, and a unique record identifier is given to each record, a hash value is determined by a hash function using a character string that combines an identifier for the table, the column identifier, and the record identifier as an argument, and then the data node for allocating the data is determined by consistent hashing, based on the hash value and information of a list of the nodes of storage destinations.

Each disclosure of the above-listed Patent Literatures is incorporated herein by reference. Modification and adjustment of the exemplary embodiments are possible within the scope of the overall disclosure (including the claims) of the present invention and based on the technical concept of the present invention. Various combinations and selections of various disclosed elements (including each element in each claim, each element in each exemplary embodiment, and each element in each drawing) are possible within the scope of the claims of the present invention. That is, the present invention naturally includes various variations and modifications that could be made by those skilled in the art according to the overall disclosure including the claims and the technical concept.

What is claimed is:

1. A distributed storage system comprising:
a plurality of data nodes coupled via a network, the data nodes including data storage units, respectively, wherein the data nodes of replication destination of data, include at least two data nodes that hold, in the respective data storage units thereof, data structures logically identical but physically different between the at least two data nodes;
a structure information management apparatus including a structure information retention unit configured to store and manage data structure management information provided corresponding to a number of types of the data structures and data arrangement specifying information, the data structure management information each including, in association with a table identifier that is an identifier to identify data to be stored, a replica identifier to identify a replica, data structure information to identify a type of the data structure associated with the replica identifier, and update trigger information that is information indicating a period to be taken for the replica to be converted to the data structure specified, the data arrangement specifying information including, in association with the table identifier, the replica identifier, data node information indicating the data nodes of one or a plurality of data arrangement destinations associated with the replica identifier;

a client function implementation unit including a data access unit configured to identify an access destination for each of an update process and a reference process by referring to the data structure management information and the data arrangement specifying information; and a plurality of the data nodes, each of the data nodes including the data storage unit, and being connected to the structure information management apparatus and the client function implementation unit;

the data nodes including:

a data management and processing unit configured to hold data in the intermediate data retention structure to return the response to the client function implementation unit, when the update process is performed, based on an access request from the client function implementation unit; and a data structure conversion unit configured to perform a process of converting the data held in the intermediate data retention structure to the data structure specified in the data structure management information, by referring to the data structure management information, according to an update trigger specified.

2. The distributed storage system according to claim 1, wherein the intermediate data retention structure holds the data until the data is stored in the data storage unit with the target data structure specified.

3. The distributed storage system according to claim 1, wherein the client function implementation unit selects the data node of an access destination according to content of the update process or the reference process, based on the data structure management information and the data arrangement specifying information.

4. The distributed storage system according to claim 1, wherein the client function implementation unit obtains the data arrangement specifying information held in the structure information retention unit of the structure information management apparatus or the data arrangement specifying information held in a structure information cache holding unit configured to cache the information held in the structure information retention unit, and issues an access instruction to the data node of a data arrangement destination.

5. The distributed storage system according to claim 1, wherein the data node includes an access accept unit, an access process unit, and a data structure conversion unit, wherein the data storage unit of the data node includes a classified-by-structure data storage unit, wherein the access accept unit receives the update request from the client function implementation unit, and then transfers the update request to the data node specified in association with the replica identifier in the data arrangement specifying information, the access process unit of the data node performs a process associated with the received update request, executes the update process by referring to information in the data structure management information, converts the update data to the data structure specified in the data structure management information and updates the classified-by-structure data storage unit when the update trigger for the data node is zero, the access process unit temporarily writes the update data to the immediate data retention structure and makes a response indicating completion of the process when the update trigger is not zero;

the access accept unit makes the response to the client function implementation unit upon receipt of a notification of the completion from the access process unit and a notification of completion from the data node of the replication destination, and the data structure conversion unit converts the data in the immediate data retention structure to the data structure specified in the data structure management information and stores the converted data in the classified-by-structure data structure unit for the converted data.

6. The distributed storage system according to claim 1, wherein the client function implementation unit, in the case of a reference access, after selecting the data structure suited to the data access for the data node, and identifying the replica identifier, computes the data node to be accessed, issues an access request to the selected data node, and then receives a result of the access process from the data node.

7. The distributed storage system according to claim 1, wherein the client function implementation unit is provided within the data node.

8. The distributed storage system according to claim 7, wherein the client function implementation unit comprises a structure information cache holding unit configured to cache the information in the structure information retention unit.

9. The distributed storage system according to claim 8, comprising:

a structure information synchronization unit configured to synchronize the structure information in the structure information cache holding unit of the client function implementation unit and the structure information held in the structure information retention unit of the structure information management apparatus.

10. The distributed storage system according to claim 1, wherein the data structure management information includes, in association with the replica identifier a number of partitions indicating a number of partitionings of data for storage in a plurality of the data nodes;

the data arrangement specifying information includes the plurality of the data nodes as the nodes for arrangement corresponding to the replica identifier associated with the number of partitions of two or more in the data structure management information; and when arrangement destinations of the partitioned data extend across a plurality of the data nodes, the access accept unit of the data node that has received the access request issues an access request to the access process unit of each of the plurality of data nodes different from the data node that has received the access request.

11. The distributed storage system according to claim 1, wherein on reception of the access request, the data structure conversion unit of the data node, when the update trigger is zero, issues an access request to the data structure conversion unit of the data node different from the data node that has received the access request.

12. The distributed storage system according to claim 1, comprising:
- a log recording unit configured to record a log of the access request; and
- a change determination unit configured to determine whether or not to convert the data structure, using information on the log recorded in the log recording unit.

13. The distributed storage system according to claim 12, wherein the change determination unit outputs a conversion request to a structure information changing unit of the structure information management apparatus, when the change determination unit determines that data structure conversion is necessary;
- the structure information changing unit of the structure information management apparatus alters the information in the structure information retention unit, and outputs a conversion request to the data structure conversion unit of the data node; and
- the data structure conversion unit of the data node converts the data structure held in the data storage unit of the data node.

14. A distributed storage method in a system comprising a plurality of data nodes coupled via a network, the plurality of data nodes respectively including data storage units, the method comprising:
- at least two of the data nodes of data replication destinations, receiving replication data; and
- storing the data in respective data storage units thereof, in data structures that are logically identical but are physically different between the at least two of the data nodes, the method comprising:
- in replication of data executed at a time of a data update, the data node of a replication destination converting the data to be updated to a target data structure specified and storing the converted data in the data storage unit, at the time, the data node temporarily holding data to be updated in an intermediate data retention structure to return a response for the update, and converting the data to be updated to a target data structure specified, asynchronously with an update request to store the converted data in the data storage unit, the method further comprising:
- a structure information management unit storing and managing structure information including data structure management information and data arrangement specifying information, the data structure management information being provided corresponding to a number of types of the data structures and each including, in association with a table identifier that is an identifier to identify data to be stored, a replica identifier to identify a replica, data structure information to identify a type of the data structure associated with the replica identifier, and update trigger information that is information indicating a period to be taken for the replica to be converted to the data structure that has been specified, the data arrangement specifying information including, in association with the table identifier, the replica identifier, data node information indicating the data nodes of one or a plurality of data arrangement destinations associated with the replica identifier;
- a client identifying an access destination for each of an update process and a reference process by referring to the data structure management information and the data arrangement specifying information; and
- the data node holding data in the intermediate data retention structure to return the response to the client, when the update process is performed, based on an access request from the client, and converting the data held in the intermediate data structure to the data structure specified in the data structure management information, by referring to the data structure management information, according to an update trigger specified.

15. The distributed storage method according to claim 14, wherein the data structure management information includes, in association with the replica identifier a number of partitions indicating a number of partitionings of data for storage in a plurality of the data nodes;
- the data arrangement specifying information includes the plurality of the data nodes as the nodes for arrangement corresponding to the replica identifier associated with the number of partitions of two or more in the data structure management information; and
- the method comprises:
by the data node that has received the access request, issuing an access request to each of the plurality of data nodes different from the data node that has received the access request, when arrangement destinations of the partitioned data extend across a plurality of the data nodes.

16. The distributed storage method according to claim 14, comprising:
- determining whether or not to convert the data structure, using information on a log recorded in a log recording unit configured to record the log of the access request, and converting the structure information and further converting the data structure of the data node when the conversion is needed.

* * * * *